(12) United States Patent
Sork

(10) Patent No.: US 8,688,493 B2
(45) Date of Patent: Apr. 1, 2014

(54) ATTACHMENT ALIGNMENT MEASUREMENT SYSTEM, METHOD AND DEVICE

(76) Inventor: Anthony Sork, Maroubra (AU)

(*) Notice: Subject to any disclaimer, the term of this patent is extended or adjusted under 35 U.S.C. 154(b) by 0 days.

(21) Appl. No.: 13/538,701

(22) Filed: Jun. 29, 2012

(65) Prior Publication Data
US 2012/0284070 A1 Nov. 8, 2012

Related U.S. Application Data

(63) Continuation-in-part of application No. PCT/AU2010/001641, filed on Dec. 6, 2010.

(30) Foreign Application Priority Data

Feb. 2, 2010 (AU) .............................. 2010900389
Mar. 2, 2010 (AU) .............................. 2010100184

(51) Int. Cl.
G06Q 40/00 (2012.01)

(52) U.S. Cl.
USPC ........................................ 705/7.11; 705/7.42

(58) Field of Classification Search
USPC .............................................. 705/7.11, 7.42
See application file for complete search history.

(56) References Cited

U.S. PATENT DOCUMENTS

| | | | |
|---|---|---|---|
| 6,228,038 B1* | 5/2001 | Claessens | 600/558 |
| 7,367,808 B1* | 5/2008 | Frank et al. | 434/219 |
| 2006/0026033 A1* | 2/2006 | Brydon et al. | 705/1 |
| 2009/0307025 A1* | 12/2009 | Menon | 705/7 |

FOREIGN PATENT DOCUMENTS

WO WO 2007/069919 6/2007

OTHER PUBLICATIONS

Naomi Simson, "Dating your employees", published on Nov. 30, 2007, Retrieved from Internet on May 19, 2010, http://web.archive.org/web/20071202034053/http://www.smartcompany.com.au/Blog/Naomi-Simson-Blog/20071130-NEW-Naomi-Simson.html.
Author Unknown, "Employee Attachment Fact Sheet", unknown publication date, Retrieved from Internet on May 19, 2010, URL:http://www.sorkhc.com.au/attachmentfactsheet.asp.
Anthony Sork, "Controlling Attrition through Attachment," Jul. 19, 2008 Retrieved from Internet on May 19, 2010, URL:http://web.archive.org/web/20080719214341/http://peoplepulse.com.au/Staff-Attrition.htm.

* cited by examiner

Primary Examiner — Justin M Pats
Assistant Examiner — Benjamin S Fields
(74) Attorney, Agent, or Firm — Leason Ellis LLP

(57) ABSTRACT

The present invention provides an Attachment alignment measurement system, method and tool, for identifying the level of Attachment Variance in a relationship between a caregiver and a subject (e.g. new member) in the social structure. Attachment Variance is the degree of alignment (or misalignment) between a subject's (e.g. new member) actual Attachment to the social structure compared with the Attachment of the subject as perceived by the caregiver. The Attachment alignment measurement method for measuring attachment variance in social structure, including the steps of measuring a Subject's actual Attachment to a social structure (Actual Attachment), measuring a primary carer's perception of the Subject's Attachment to a social structure (Perceived Attachment), and comparing Actual Attachment and Perceived Attachment such that Attachment Variance is assessable, wherein Attachment Variance provides an indication of alignment between a Subject's Actual Attachment the Perceived Attachment and the programming instructions for performing the steps.

12 Claims, 10 Drawing Sheets

ATTACHMENT ALIGNMENT MEASUREMENT SYSTEM, METHOD AND DEVICE

CROSS REFERENCE TO RELATED APPLICATIONS

The present application is a continuation-in-part of International PCT Patent Application No. PCT/AU2010/001641, filed Dec. 6, 2010, which is hereby incorporated by reference in its entirety and claims priority to Australian patent Application Serial Number 2010900389, filed Feb. 2, 2010 and Australian Patent Application Serial number 2010100184, filed Mar. 2, 2010 under 35 U.S.C. 119, which is hereby incorporated by reference in its entirety.

FIELD OF INVENTION

The present invention relates to tools for measuring Attachment alignment, and particularly Attachment alignment in a social structure, such as a workplace or educational institution.

The invention has been developed primarily as a computer implemented measurement tool for measuring alignment between perceived and actual Attachment of a new member in a social structure. However, it will be appreciated that the invention is not restricted to this particular field of use.

PROBLEMS OF THE PRIOR ART

The commercial cost of poor employee Attachment is significant. Organisations spend money to attract, recruit, and induct new employees. Their objective is to find, train and develop employees, whilst accepting the cost to do so on the basis that they will get a return on their investment at a critical point in the future, every day after which will generate profit. This is characterised as a "loss leader" approach. The point at which the costs incurred are recovered is regarded as the "return on investment" (ROI).

The cost incurred by the employer varies by organisation and industry. Generally, costs are incurred directly by expenditure on the following:
(a) advertising;
(b) hiring manager and other personnel time in the recruitment process (interviewing, telephone screening, referencing etc.);
(c) 3rd party recruiter fees (30% of recruitment in Australia and NZ is done through a 3rd party recruiter);
(d) training—time of the new employee, trainers, venue and resources;
(e) on-the job coaching—time of the manager and other team members;
(f) resourcing and equipping the new employee—business cards and other labelled resources, security mechanisms, system usage, time of the supporting staff who do this;
(g) salary of new employee during this time;
(h) indirect—e.g. lost opportunity and team productivity and efficiency.

Conservatively these costs are regarded to be approximately AU$50,000 per employee. That is, for every employee that is able to be retained beyond the point of "return on investment"—specifically related to the direct costs of attracting, recruiting and inducting (conservatively AU $50,000) they are able to add significant profitable contribution to the business.

Increased employee contribution is shown by comparing a high performing employee's output with a newly hired employee during the same first 3 month period, where the contribution gap is significant. This will vary by industry, but the productivity and performance potential difference is consistent based on competency difference alone. Extending the performance comparison beyond the initial 3 month period, assuming competency is now of similar levels, the key factor in performance differential is "effort".

A highly attached employee will apply a greater level of "discretionary effort" with the same competency to achieve a higher level of performance compared to a moderate or poorly attached employee. Therefore, even if the organisation manages to retain a poorly attached employee, thereby saving the attrition costs, the organisation will still suffer from lower performance because of lower levels of discretionary effort.

Although at the time the employee leaves, up until the 18 month mark, the cost of attrition may remain somewhat fixed (as it is relative to the cost of attraction, recruitment and induction of their replacement), the longer the organisation retains a poorly attached employee the greater the loss in terms of relative performance when compared to retaining an employee who has achieved high Attachment.

A recent study by *Kelly Services Australia and New Zealand* of the Contact Centre industry 2006/07 shows projected industry annual attrition of circa 41.52%. The average tenure is 20 months. Though 18 months is the divide typically for issues associated with Attachment vs retention, these figures suggest a significant proportion of employees that are leaving are experiencing low or moderate levels of Attachment.

In simple terms, looking at a contact centre of 100 people the following results are found: 40% total attrition and 30% attrition of employees with less than 18 months experience, this is 30 people leaving with a high correlation to poor or moderate Attachment. In dollar terms for replacement costs alone this equates to AU$1,500,000 per year, although this does not factor in the performance differential for the time after the ROI until their departure. Extending these figures out over the industry and then beyond this to the wider market demonstrates the phenomenal cost to the economy of poor Attachment by new employee(s).

Attachment and particularly, variance in Attachment, to a social structure such as a workplace is critical for planning and stability through assessment of bonding. For example, in the workplace context, measuring the degree of Attachment of an employee to the employer/workplace is important for staff retention and workplace relations. Similarly, the level of Attachment of a client to a supplier is important for assessing the strength of client relationships and loyalty to the supplier, as is a child's level of Attachment to a class environment/school is important.

To date, there are limited means available to measure Attachment to social structures, including in a commercial context. The practice of conducting "360 degree" assessments does not provide an objective measure of, say, an employee's Attachment to a workplace. Workplace reviews and feedback are limited to providing linear measurements (direct line of reporting up, or down, the management chain) of performance (through self-assessment or direct report assessment) but not Attachment. Therefore, they do not allow measurement of, say, a new employee's level of Attachment to a workplace.

Australian Patent No. 2008100458, which is hereby incorporated by reference in its entirety, describes a device, system and method which provides a means to measure the level of Attachment (emotional and intellectual bond) to the social structure achieved by the "new member" during the "Critical Attachment Period" (unique and specific period of bonding)

that is influenced most significantly by the "primary carer" (individual primarily responsible for the direct care of the new member). The device, method and system then creates a report which contains the measure of Total Attachment, a measure of Attachment on each "Driver" that contributes to Total Attachment, and an observation about the impact of the primary carer during the Critical Attachment Period up until the date of measurement. The report also provides a "recommendation" as to how to address (improve or maintain) the level of Attachment between the date of measurement and the end of the Critical Attachment Period.

The key measure in Australian Patent No. 2008100458 is the "actual" Attachment of the new member derived from the answers they provide at the first valid measurement period during the Critical Attachment Period. The results of which are used to form a report on and about the impact of the primary carer up until that point in the Critical Attachment Period and indicative of what will be the final measure if no significant behavioural change occurs in the primary carer during the remainder of the Critical Attachment Period. The Critical Attachment Period varies depending on the social structure and is measured from the date of commencement for a new member or where a structural change occurs in reporting line for any existing member.

Australian Patent No. 2008100458 thus describes a means for measuring a new member's Attachment to a social structure, say, a new employee's Attachment to a workplace/an employer. However, it does so by measuring the employee's actual Attachment. There is a need for a means for assessing whether a new member's actual Attachment differs from the member's level of Attachment as perceived by the social structure—that is, whether the social structure's perception is aligned or misaligned with the new member's perception. The difference reflects a level of alignment (or misalignment) between actual Attachment and perceived Attachment.

It is an object of the present invention to provide an Attachment alignment measurement system, method and device, for assessing the difference between the actual Attachment to a social structure achieved by a new member and the perceived Attachment level the social structure believes has been achieved.

According to one aspect of the invention there is provided a computer-implemented Attachment alignment measurement tool for measuring Attachment Variance in a social structure, including programming instructions for performing the steps of:
  a) measuring a Subject's actual attachment to a social structure (Actual Attachment)
  b) measuring a primary carer's perception of the Subject's Attachment to said social structure (Perceived Attachment);
  c) comparing Actual Attachment and Perceived Attachment such that Attachment Variance is assessable, wherein Attachment Variance provides an indication of alignment between Actual Attachment and Perceived Attachment; and
  d) generating an Attachment alignment report,
  such that the Attachment alignment measurement tool is capable of calculating Attachment Variance for a Subject.

According to a further aspect of the invention there is provided a computer-implemented Attachment alignment measurement tool for measuring Attachment Variance in a social structure, including:
  programming instructions for performing an Attachment alignment measurement method to assess alignment between:
    a) Actual Attachment, wherein Actual Attachment is a Subject's actual attachment to a social structure; and
    b) Perceived Attachment, wherein Perceived Attachment is a primary carer's perception of said Subject's Attachment to said social structure,
  wherein the programming instructions enable performance of the Attachment alignment measurement method by the Attachment alignment measurement tool such that Attachment Variance is assessed.

The present invention thus provides an Attachment alignment measurement system, method and device, for assessing the difference between the actual Attachment to a social structure achieved by a new member and the perceived Attachment level the social structure believes has been achieved.

BRIEF DESCRIPTION OF THE DRAWINGS

A preferred embodiment of the invention will now be described, by way of example only, with reference to the accompanying drawings in which.

DETAILED DESCRIPTION

Figure 1:
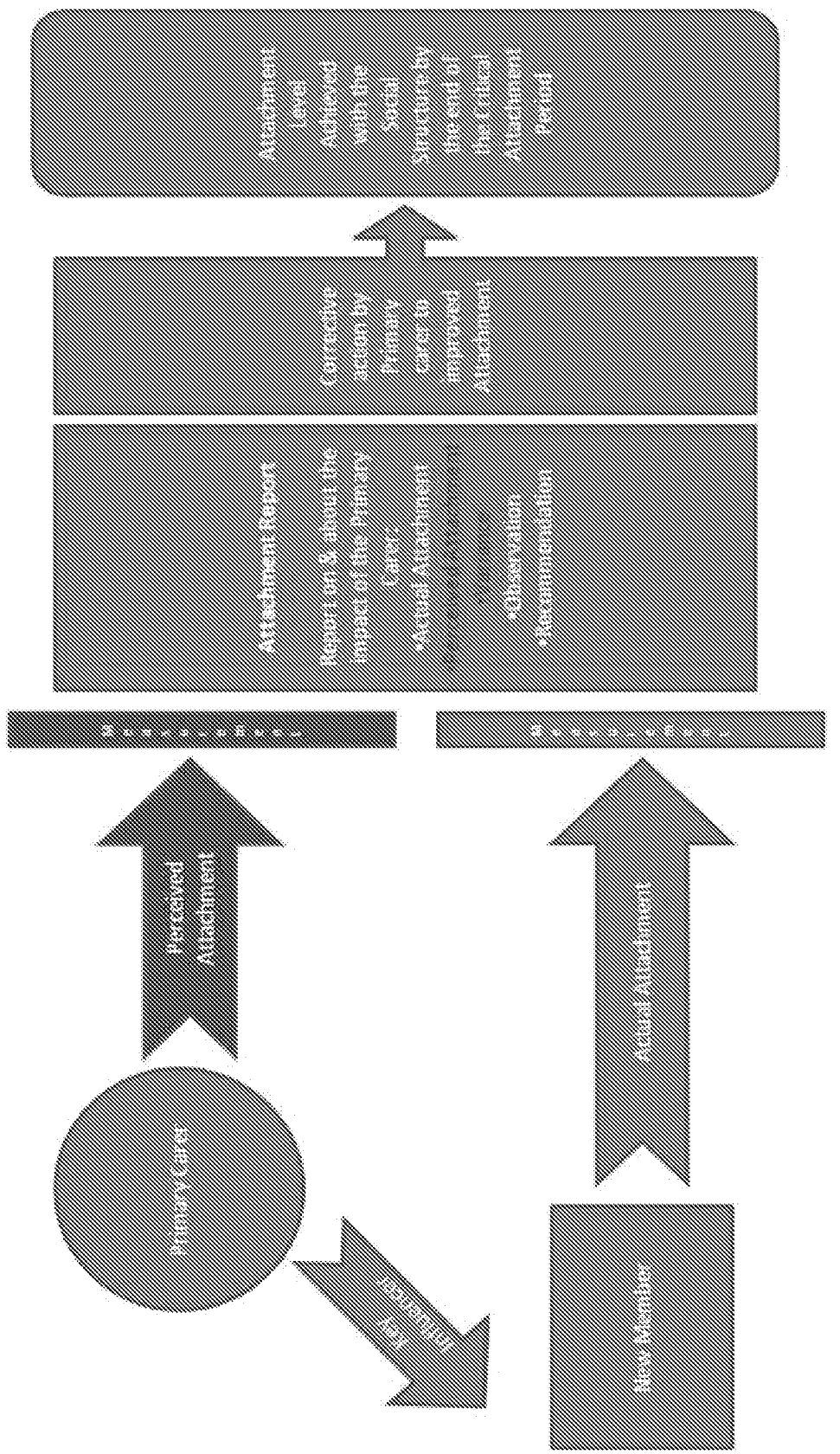
FIG. 1 is a schematic illustration depicting the difference between actual Attachment and that of perceived Attachment.

A preferred embodiment of the present invention will now be described by reference to the drawings. The following detailed description in conjunction with the figures provides the skilled addressee with an understanding of the invention. It will be appreciated, however, that the invention is not limited to the applications described below.

Dictionary of Defined Terms

Table 1 is a dictionary of terms defined according to the invention. Terms defined in Table 1 are denoted with the administration of capitalisation throughout the document. If a term is not capitalised then its plain meaning is to be construed, unless otherwise specified.

TABLE 1

Dictionary of defined terms

| Term | Description |
|---|---|
| Attachment | Attachment is both a phase (specific period in the employment bonding, such as employment, lifecycle) and an effect (result of experiencing the phase of employment) at the very beginning of a relationship between an individual and a social entity through a primary carer or authority figure. It is the psychological and intellectual bond perceived by an individual, achieved within a prescribed period that is unique to the entity with whom they are in employment bonding. Attachment Bonding<br><br>All creatures requiring care post gestation display Attachment to varying degrees to their carers. Attachment employment bonding's roots are as a survival mechanism for animals who require safety, sustenance and social conditioning in order to survive through to self-sustainability. The main evolutions and application of Attachment employment bonding are:<br>1. Filial Imprinting and Bonding - popularised by Lorenz in the early 1900's but based on the work of Spalding and Heinroth. The Attachment Bond was demonstrated by the now regularly repeated imprinting and employment bonding process demonstrated by ducklings and geese in the critical moments after hatching to the first animate object they see within close proximity.<br>2. Childhood Developmental Attachment - most notably the work of Bowlby and Harlow that explored the impact of abandonment and helplessness in early childhood development.<br>3. Adult Romantic Attachment - Among others, the work by Hazen and Shaver that explored the problematic romantic employment bonding of adults suffering from Attachment disorder.<br>4. Workplace Attachment - The inventor's findings reveal that Attachment employment bonding can be applied to adult social employment bonding experiences, with specific commercial application to the subject-for example the employee (subject) and employer (entity) relationship, as well as to the customer (subject) and supplier (entity) relationship.<br>5. Educational Attachment - the importance of attachment during the educational years aid the foundation of learning. When children are securely attached to their caregivers and/or teacher they experience less developmental delay than their counterparts.<br>6. Situation attachment - attachment bonding can alter the outcome for individuals that arrive in unfamiliar situations, such as intensive care units where the outcome to be achieved is "good health" or even a "good death"(see Truog et al 2001) in critical care circumstances. For example, the patient (subject) and the clinician (entity) relationship is established so a clinician(s) with leadership role reinforces excellence in the patient's care is the priority.<br>The term Attachment is used in this document to refer to the business and workplace environment as an example of a broader commercial context such as between supplier and customer. |
| Driver | a conscious and subconsciously assessed criterion, that is common to target a subject (e.g. employee) during a phase of assessment, such as the Attachment phase. |
| Onboarding | Onboarding is the process of integrating new employees into an organisation's culture to efficiently maintain meaningful, productive work and strong employee relationships, or a new member into any social structure. |
| Subject | The term Subject is used to include all members of a social structure e.g. personnel who have a relationship with an organisation and/or a workplace, child with a classroom, nurse to a hospital, worshipper to a congregation, client to a supplier and so on. This relationship is typically a working relationship that may include consultants, contractors, part-time workers, casual staff, suppliers, personnel operating from service companies and the like. |
| Variance | Is a measure of the primary carer's perception of the Attachment level of the new member, and by comparing the "Actual" and "Perceived" scores, provide a "Variance" score in the Attachment alignment Report. For the sake of clarity we also refer to Variance as Attachment Variance. |

The present invention provides an Attachment alignment measurement system, method and device, for identifying the level of Attachment Variance in a relationship between a social structure and a subject (e.g. new member) in the social structure. Attachment Variance is the degree of alignment (or misalignment) between a subject's (e.g. new member) actual Attachment to the social structure—for example, a new Employee's Attachment to an employer (e.g. manager/workplace, a client's Attachment to a supplier, or a student's Attachment to a teacher/school—compared with the Attachment of the subject as perceived by the social structure. FIG. 1 illustrates the difference between actual Attachment (measured directly from the new member) and perceived Attachment (measured by assessing how well the primary carer believes the new member has Attached to the social structure).

The system, method and device are useful for measuring Attachment alignment (or Variance) in any social structure in which there is a primary carer role who takes responsibility for engendering feelings of security, trust, acceptance and belonging in a new member joining the structure. Typically in the workplace context, this is the direct report to a new employee or to a new team member moving internally within the same workplace. In peer networks, the primary carer role often evolves over time as a person adopts the role of a convener responsible for welcoming new members.

The system, method and device enable measurement of Attachment alignment over time and whenever Attachment is re-set—for example, whenever a new primary carer enters a Critical Attachment Period with a new subject. Attachment is reset whenever a new primary carer-subject relationship occurs within the social structure such as when a new employee joins an organisation, when a new manager is appointed (e.g. through promotion or lateral transfer) or when an existing employee moves to a different team within a workplace.

The social structure is any group of people coming together with a shared purpose—e.g. a workplace, hospital, congregation, political party. The subject can be a new member can be a new member or an existing member entering a new subgroup within the social structure (in which the subgroup is the relevant social structure for the purpose of assessing alignment within the subgroup).

Application of Attachment Alignment Measurement into a Commercial Context

The present invention is an improvement on the Attachment measurement means described in Patent No, AU 2008100458 titled "Attachment measurement device, system and methodology", which did not account for the perception of the primary carer (e.g. manager, main client contact, teacher in an educational context) or measure alignment between actual and perceived Attachment.

Primary Carer Perceptions of Attachment

The perceptions of the primary carer are of significance because they drive the behaviour of the primary carer which impact on Attachment perceptions towards the employee during the first 90 days. Although the primary carer is enabled to subjectively compare the employee's actual Attachment level to their own perceptions, a formal measurement of the primary carer's perception will quantify the variance between the actual and perceived Attachment levels. This in turn enables the highlighting of Drivers and accompanying reasoning as to why the primary carer may or may not be addressing Attachment driver perceptions during the first 90 days.

The measurement of the primary carer perceptions of Attachment serves as:
1. a means of prioritising corrective action during the remainder of the critical
Attachment period (120 days); and
2. an opportunity to reflect on what perceptions lead to this variance.

This can lead to preparation and improvement of the primary carer's impact on future new employees.

Using the device of Patent No. AU 2008100458, primary carers (e.g. a manager in a workplace) receiving the Attachment report can justify why the Attachment perceptions of a new member (e.g. a new employee or an existing employee moving into a new department or role) are lower than desired and that they already knew this was the case. By contrast the Attachment alignment measurement system, method and device of the present invention measures the manager's perceived Attachment as well as the new member's actual Attachment. This removes the ability of the primary carer to justify and excuse the behavioural choices they have made because they will be identifying what they believe is the Attachment that has been achieved across each of the 20 Drivers.

In a preferred embodiment, the Attachment alignment measurement system records, analyses and reports on data from:
1. the primary carer's perception of the Attachment level of the new member;
2. the new member's actual Attachment;
3. the "actual" and "perceived" scores as compared, and
4. "variance" score in an Attachment alignment report.

The impact of these new measures results in an evaluation of:
1. the actual Attachment of the new member to the social structure/primary carer; and comparing this to
2. the perceived Attachment level of the new member to the social structure/primary carer.

These measurements of Attachment Variance between the new member and as perceived by the primary carer are a form of indirect self-assessment as opposed to direct self-assessment of Attachment as used in "360 degree assessments". The advantage is that an objective evaluation of Attachment is obtained by indirect means, through evaluation of a range of measures (e.g. by measuring the alignment between actual and perceived Attachment), rather than the linear direct assessment method of traditional "360 degree" evaluations.

A traditional 360 degree measurement exercise, which forms a direct measure, asks the raters to provide a measure on the subject and for the subject to rate themselves. For example:

Employee—Please rate your manager (generates a score about the manager)
Manager—Please rate yourself (generates a score about the manager).

The inventor's research reveals that the Driver(s) that have the greatest impact on the Attachment perceptions of a new member, say in the employment context, during the Critical Attachment Period (first 120 days) are those that make up the behavioural impact of the primary carer (e.g. direct report [manager] for a new recruit or a new team member). If a primary carer's perceptions are found to be misaligned with the new member's perceptions, the primary carer's behaviour is typically influenced and the opportunity provided to change behaviour and the level of actual Attachment.

The measurement of the new employee's actual Attachment reveals an indirect measure of the impact of the primary carer behaviour. Therefore, measuring the impact of the primary carer's behaviour(s) on Attachment and reporting these to the primary carer enables an intervention to be enabled. This is in contrast to tracking and measuring the actual behaviours of the primary carer (which would be a direct measure) which are not necessarily aligned to the perception of the employee, since the employee is in a state of change and learning, and therefore not settled to provide meaningful information about perceived behaviour of the primary carer.

By measuring the primary carer's perception of the Attachment level of the new employee at the 90th day, the manager is providing a perceived measure of the impact of their own behaviour. They are in fact rating themselves by providing a perceived measure of Attachment of the new employee. This is an indirect self-assessment—for example:

Employee—Please rate yourself (generates a score about the employee which is a measure of the impact of the manager)
Manager—Please rate the employee (generates a score about the employee which is a measure of the impact of the manager).

The inventor's research has determined that Attachment bonding can be applied to adult social bonding experiences, with specific commercial application to the employee-employer relationship as well as the supplier-customer relationship. AU 2008100458 provides means for measuring a subject's Attachment to a social context—such as a new employee's Attachment to a workplace/employer within the Critical Attachment Period (for example, in the workplace, this is the first 90 to 120 days of employment with a new employer).

In a preferred embodiment, the Attachment alignment measurement system, method and tool of the present invention measure Attachment from the perspective of the social structure (e.g. employer/manager in a workplace), and compare it to the level of Attachment of a new member to the social structure (e.g. a new employee) measured from the employee's perspective (the latter measured, for example, by using a tool such as that described in AU 200810045). The invention thus provides an indirect means for self-assessing. An analogy can be made to assessing a teacher by measuring the knowledge or performance of students rather than measuring the teaching methods of the teacher directly.

In a preferred embodiment, the Attachment alignment system includes means to generate an Attachment alignment report based on analysis of the Attachment and Attachment alignment measures obtained. The report can be in electronic and/or written format and reports any difference between actual and perceived Attachment of a new member to a social structure. Variance in the Attachment measures assists to identify subjects (e.g. employees, customers) who have greater organisational Attachment. This enables corrective measures to be identified and implemented, and also allows the identification of predictor variables and drivers useful in evaluation.

The use of predictor variables to indirectly capture the Attachment Variance between the primary carer (e.g. manager) and the subject (e.g. new member) are correlated from unique sources. This improves overall predictive accuracy and enables the organisation (and indeed subject) to implement a corrective mechanism if and when the Attachment Variance is too high.

There can be a cognitive dissonance within the collective consciousness of an organisation (e.g. workplace). This can be caused by variance between the primary carer's perceptions of the Attachment level of a new member of the organisation (e.g. a new employee) compared with that new member's actual Attachment (as measured by direct assessment from the member)—so called Attachment Variance. The contradictory Attachment measures can cause disturbance within an organisation and hinder Attachment growth.

Growing variance between actual Attachment and perceived Attachment without intervention can result in actual Attachment decreasing, for example, so as to become aligned with a lower perceived Attachment. This is not beneficial to the organisation or the subject concerned.

Therefore, awareness of one's Attachment and alignment, as opposed to the perception of Attachment, and measuring Attachment alignment provides an opportunity to improve Attachment by placing into the organisation (e.g. workplace) a motivational drive to reduce dissonance by changing the primary carer's and/or the subject's behaviours/interactions and therefore perceptions.

Figure 2:
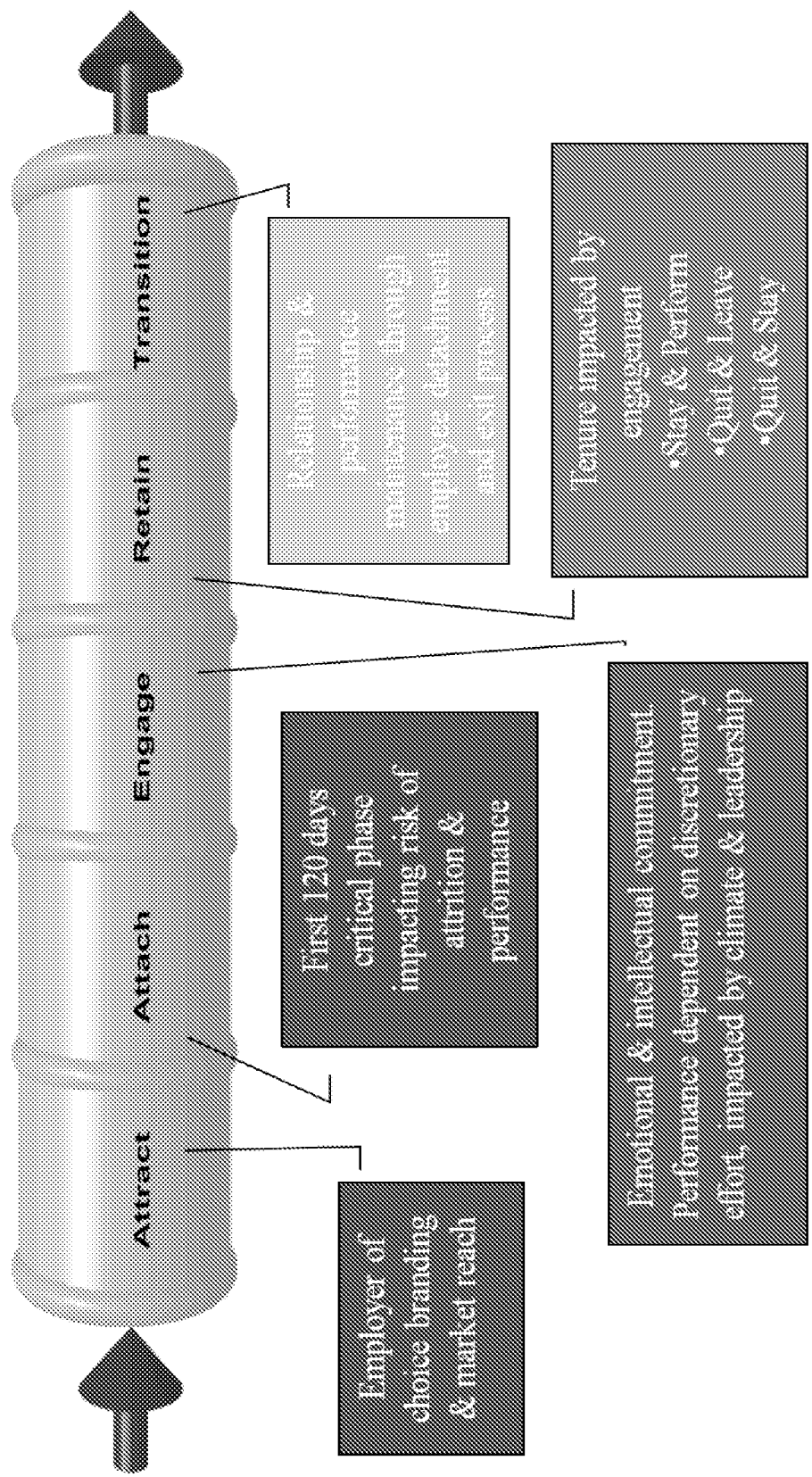
FIG. 2 is a schematic representation of the five major phases of employment.

FIG. 2 shows the phase of Attachment is one discrete phase within employment bonding out of 5 phases of employment bonding with any employer. These phases are chronologically divided as follows:
  (a) Attraction
  (b) Attachment
  (c) Engagement
  (d) Detachment
  (e) Transition
  (f) Post-employment.

Data used by the Information Collection System is ideally obtained via human resource databases, or accompanying databases such as payroll records etcetera, which can be entered manually, by use of open database connections (ODBC) or via export to the Attachment tool's Information Collection System.

Each of these phases has a distinct set of characteristics and Drivers commonly understood by both the employer and the employee. The period of focus for this invention is the second phases with its associated Drivers which enables a means for:
  (a) evaluation of how a workplace performs; and
  (b) identification of opportunities for gaining a better return on the time and money invested into a new employee.

One embodiment provides means to measure indicators such as Attachment early in the relationship lifecycle (e.g. early in employment before an employee such as an employee on probation or newly re-located/transferred or promoted employee departs). This is advantageous for an organisation to either:
  (a) plan for potential departure; or
  (b) promote activities which will raise employee Attachment to the organisation during the critical Attachment period.

The benefit of knowing the degree of Attachment employment bonding variance impacts on:
  (a) the risk of employee attrition in the first 18 months of employment (or during the corresponding Critical Attachment period in a new role or team);
  (b) the amount of discretionary effort applied by an employee over the first 18 months of employment bonding (or equivalent as outlined above);
  (c) the performance of the employee over the first 18 months of employment bonding (or equivalent);
  (d) the effectiveness of managers both directly and indirectly involved with new employee(s);
  (e) the effectiveness of teams directly and indirectly involved with new employee(s); and
  (f) the overall effectiveness of the workplace.

Figure 3:
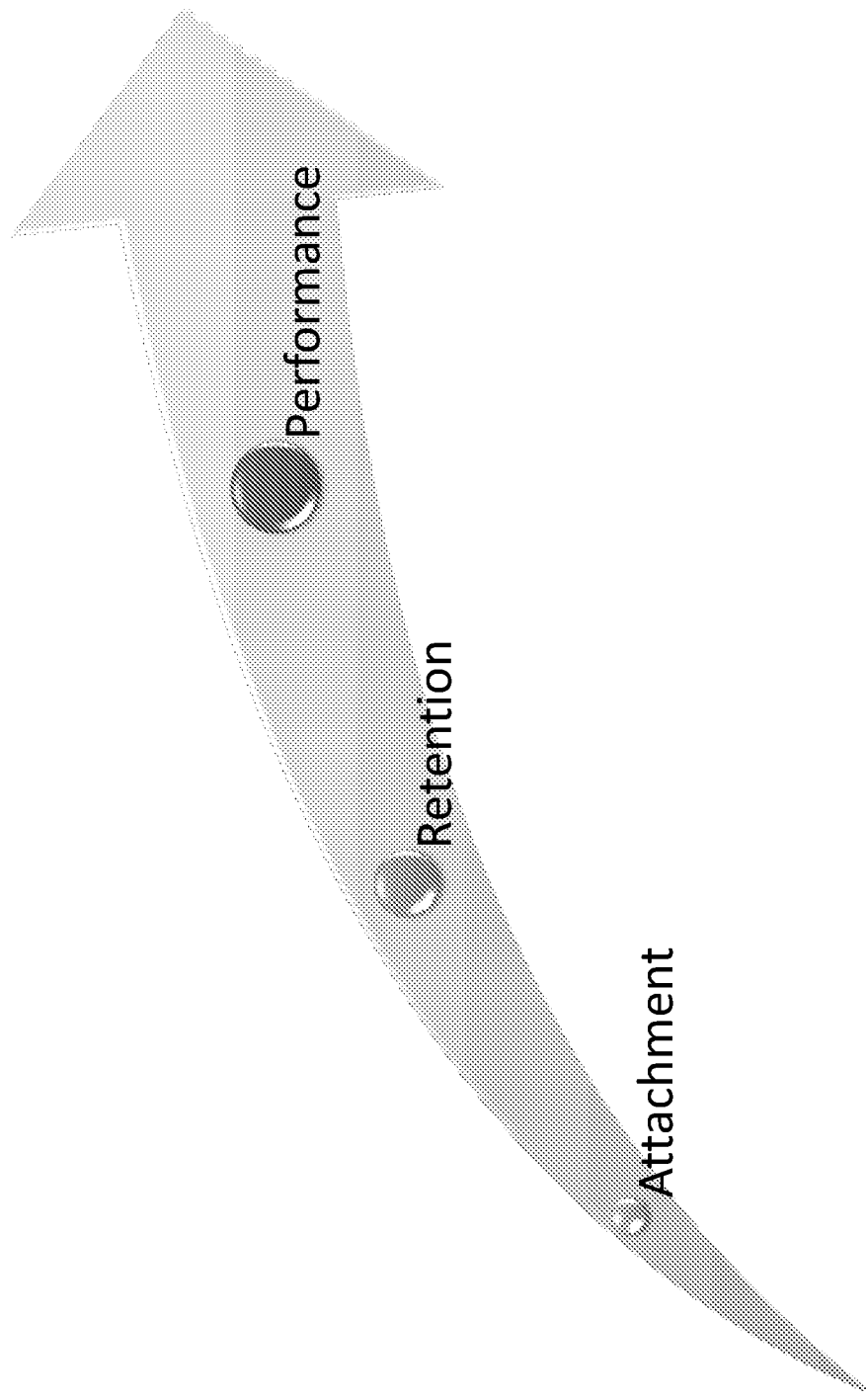
FIG. 3 is a schematic representation showing the relationship between Attachment, retention and performance.

FIG. 3 shows schematically the relationship link between Attachment, retention and performance. Schematically, Attachment variance must be present and optimised to ultimately obtain employee performance.

This invention provides a means to benefit an organisational workplace by measuring and aiding in the promotion of employee Attachment. This provides the means to raise Attachment and thereby reducing employee attrition. Increasing the level of Attachment in turn improves the performance of retained employees. This, in turn, reduces costs and improves employee contribution to the organisation.

The use of computer technology is critical to the measurement of Attachment and Attachment variance to the workplace by employees, since the objective depersonalised means for the collection of Attachment data at a critical time period in the workplace is enabled without notifying the direct manager of the data collection, so as to enable the collection of data in an un-influenced manner. Moreover, the production of Attachment measurement report from the collected data to an organisation's management is obtained in an objective and consistent manner.

The computer implemented data collection, processing, analysing and reporting system provides a business method implementation for assessment of employee workplace Attachment and Attachment Variance that can be acted upon within the required critical time periods.

In addition to data being obtained from a subject such as a new employee (new member), separate data is also obtained from the direct manager (primary carer) of the subject employee to rate their perception of the Attachment level of the employee. The results of which will then be represented in the Attachment alignment report showing:
  (a) Employee (subject) Attachment Score: X %
  (b) Manager (Primary Carer) Perception Score: Y %
  (c) Variance/Alignment Score: X %–Y %=Z %
  (d) Priority Rating: High/Moderate/Low The Attachment perceptions and actualities of both the employee and the manager provide a variance/alignment score and priority rating. The variance/alignment score is linked to the provision of Attachment variance/alignment observations which outline the degree to which the perceptions of the manager are aligned to the actual Attachment level of the employee.

The Attachment alignment report provides observations and recommendations based on the actual Attachment score and the Attachment Variance of the subject (e.g. employee) for each Driver.

After data collection, an Attachment alignment report is provided to, and for, the manager/organisation. The report is derived from the answers provided by the new member (e.g. a new employee, new pupil or student, or a new customer) and the primary carer (e.g. manager, main organisational contact for a customer, teacher in a school). Importantly the recommended actions to the manager/organisation relate to maintaining or altering the perceptions of the subject (e.g. a new employee) within the critical Attachment period (e.g. 120 day timeframe in the workplace context).

The Attachment alignment measurement is used to aid bonding modelling and intervention to influence organisational ROI and cost-benefit forecasts. The computer implemented Attachment alignment measurement system, method and device is able to be applied to any social structure with new members (e.g. newly engaged employees) with a view that these members will contribute to the performance of the structure over time, so long as they are "Attached" to the structure.

EXAMPLE 1

Sample Context for use of Attachment Alignment System, Method and Device for Measuring Employee Attachment Period Critical Milestones In the employment context, Attachment is achieved in the first 120 days of employment bonding, and is specifically associated with the new employee (subject) and the workplace (entity) with whom they are employed primarily through the immediate manager (object). This first 120 days is referred to as the Critical Attachment Period for Attachment bonding to take place in the employment context. Depending on the social structure the specific duration of the Critical Attachment Period may vary. However, social structures share the common element that a Critical Attachment Period exists during which time Attachment of a new member to the social structure takes place.

Information Collection System

A preferred embodiment of the invention includes an Attachment tool information collection system (hereafter "Information Collection System"). In its simplest form, the Information Collection System is a database or spread sheet which contains employee detail data such as the employee name, a Communication address (for example, an email address, an SMS number, an instant messaging address, or other communication means), direct report(s), business unit(s), first date of employment bonding, etcetera.

Data used by the Information Collection System is ideally obtained via human resource databases, or accompanying databases such as payroll records etcetera, which can be entered manually, by use of open database connections (ODBC) or via export to the Attachment tool's Information Collection System.

Information is collected from the primary carer simultaneously with the new employee. Both are provided with instructions on how to submit information via secure links without discussing it. This information request will occur at the $90^{th}$ day of employment of the new employee. A reminder message is sent if they have not completed the information requests within 3 working days. The Attachment alignment report is produced once both the employee and the primary carer have provided the requisite information as requested.

Steps required to obtain information include:
1. A request is submitted to measure Attachment
2. Request processed and details of the employee, primary carer and organization entered onto Information Collection System
3. Information Collection System links generated and sent to employee and primary carer on the $90^{th}$ day of employment (or closest working day)
4. Reminders sent to both the primary carer and the new employee if survey not completed within 3 working days
5. Information Collection is received from both primary carer and new employee and a report is generated
6. Report sent to designated recipient (such as a HR representative or primary carer)

Criteria for Subject (e.g. Target Employee) Eligibility

The Information Collection System, on receipt of the above data, runs calculation software (programming instructions) within the database or spread sheet which can log events such as the number of days post starting employment which is an example of a critical event (other examples of a programming instructions such as returning to employment from maternity leave, starting a new position, acquisition of the company or other significant workplace event). This sets the eligibility Criteria for Subjects (e.g. new employees) to be screened to enable selection of those employees suitable to measure their Attachment to the workplace. These are referred to as target employees.

The details of each Subject's primary carer are provided at the date of request (name, email) and the criteria for generating and sending the survey to the primary carer are linked to the date of the new employee.

Critical Events and Dates

The information collection system stores information about a Subject (e.g. an employee) and any critical event affecting the Subject (employee). The Information Collection System also enables the calculation of critical dates, including days since a critical event. This enables selection of employees for assessment who meet the eligibility criterion of being at X days post a critical event (e.g. since first joining the employer) or a combination of selection criteria.

This enables the Attachment tool to be used, say, in the workplace for assessing Attachment of:
1. new employees, where the calculation of the critical date periods is obtained via the data collection of each employee's first date of employment bonding plus, for example, 90 to 120 days.
2. existing employees who undergo a critical event, such as transfer from one business unit to another, a return from maternity leave, a relocation e.g. from Sydney to Beijing, a promotion, a return from injury, sabbatical or other long term leave, or a restructure or acquisition or merger of the organisation.

Attachment occurs and can be measured for every social structure that includes:
a new member joining;
a new primary carer appointed; and/or
an existing member structurally realigned to a new primary carer.

This therefore also applies to, for example, a customer/client relationship.

The critical Attachment would vary, but the methodology associated with measuring Attachment would be similar relative to the first valid measurement date for the drivers associated with Attachment for that social structure.

Communication with Target Employee

On meeting a specific critical date (such as the $90^{th}$ day post new employment bonding date), the Information Collection System sends a computer based communication to the target employee(s) with a request to respond. In other words, an eligible Subject will receive a computer-based communication from the Information Collection System of the Attachment alignment measurement tool.

The Information Collection System is enabled to interface with one or more workplace computer systems to gather from target employee(s) their responses. This communication is enabled to use one or more computer based technologies including:
a) microphone(s) to capture elicited voice response(s);
b) camera(s) for facial and body language to capture elicited response(s);
c) check box selections to capture elicited quantitative responses; and/or
d) short answer selections to capture elicited qualitative responses;

such that said responses are returned to, and populate, the Information Collection System to enable observations to be ascertained.

This communication can be in the form of, or a directions to (via a link or similar means) to specific stimuli such as a questionnaire, a voice file, a short movie or any other medium which stimulates the employee to consider providing feedback in the form of a response at specific intervals, such as when the employee is asked a specific question or a specific response is evoked.

The data can be collected through quantifiable questions such as rating the answer on a scale from 1 to 5 (or poor to excellent) or having qualitative answers such as having sliding dials, colour scales, or allowing the employee to type answers or to record voice response, which can be subsequently analysed with voice recognition software, tonal recognition software or text interpretation software, such that an analysis of the data is enabled by a computer.

The Attachment alignment measurement tool includes programming instructions to enable sending of the above communications, recording of any responses to such communications and analysis of collected data by a computer.

Information Interpretation System

One or more responses are calculated and/or ascertained by an information interpretation system(s), which interprets said responses in accordance with interpretation criteria and interpretation matrices (hereafter the "Information Interpretation System"). This is enabled through the inclusion in the tool of programming instructions for the information interpretation system to calculate and interpret responses in accordance with interpretation criteria and matrices.

The Information Interpretation System comprises one or more means for:
a) individual Driver scoring,
b) summation of driver scores to generate an accumulative score;
c) interpretation of accumulative score; and
d) observation and recommendation outputs.

The Information Collection System is enabled to interface with one or more workplace computer systems to gather responses from Subjects (e.g. target employee(s)) and pass the responses to an information interpretation system to:
a) interpret a score to generate observations; and
b) generate a recommendation based on the observations and contextual issues with regard to workplace requirements, for example, workplaces growth, risk, and economic targets.

An Information Collection System and an information interpretation system may be one and the same device such as a spreadsheet and/or a database, including programming instructions which enable performance by the tool, on receiving response data, to generate one or more observations and compile a report. In this scenario, the Information Collection System and an information interpretation system have different roles within the one device/software/apparatus.

Figure 4:
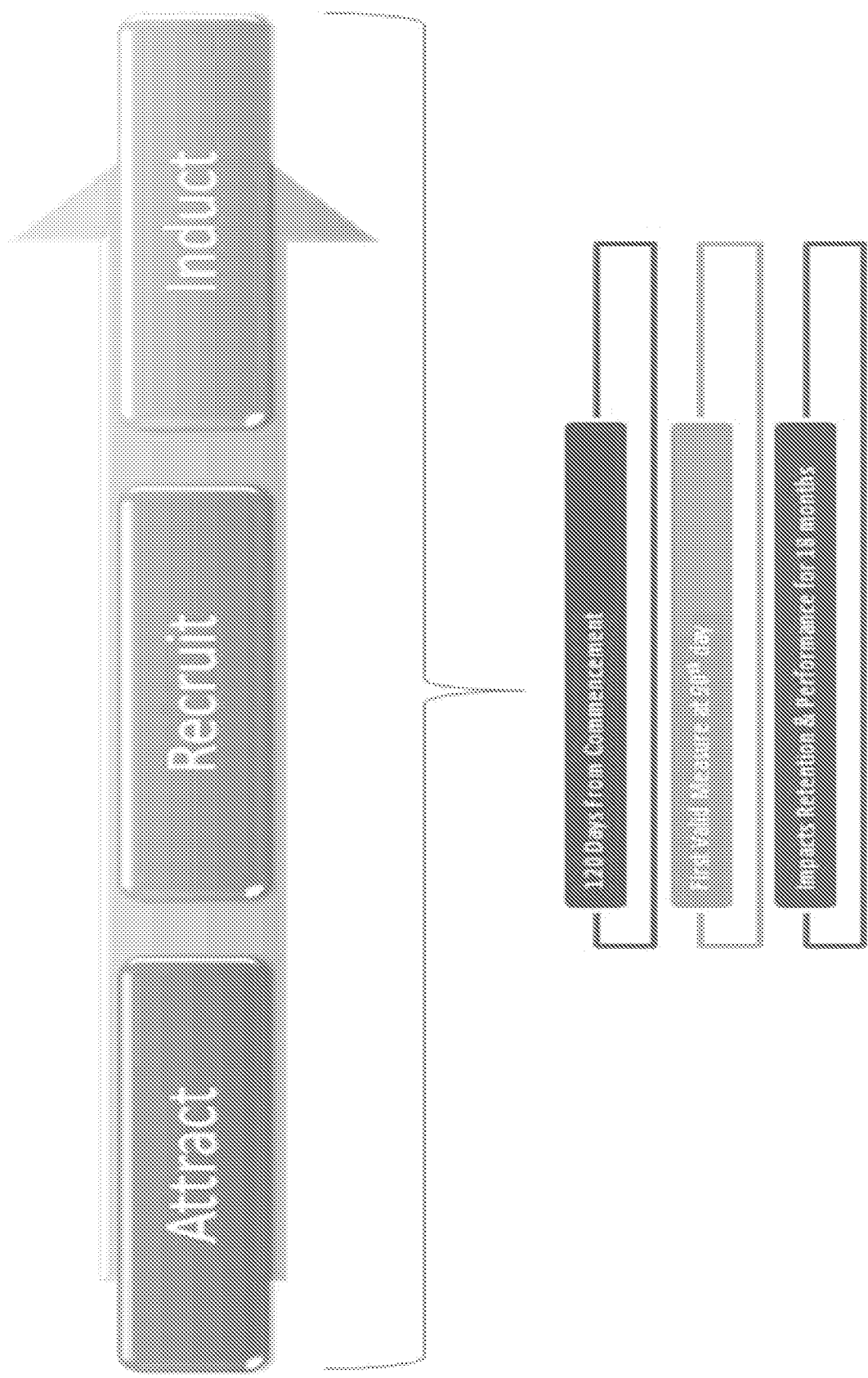
FIG. 4 is a schematic representation of the critical phase of Attachment for a new member to a social structure (e.g. a new employee to a workplace).

FIG. 4 reveals the model which has been developed in line with time frame identified as being the critical phase of Attachment for new employees, which is the first 120 days of employment bonding (not including their notice period). These criteria are determined via background research and may be subject to change depending on the circumstance of the workplace, target employees, background research findings and other criteria.

Figure 5:
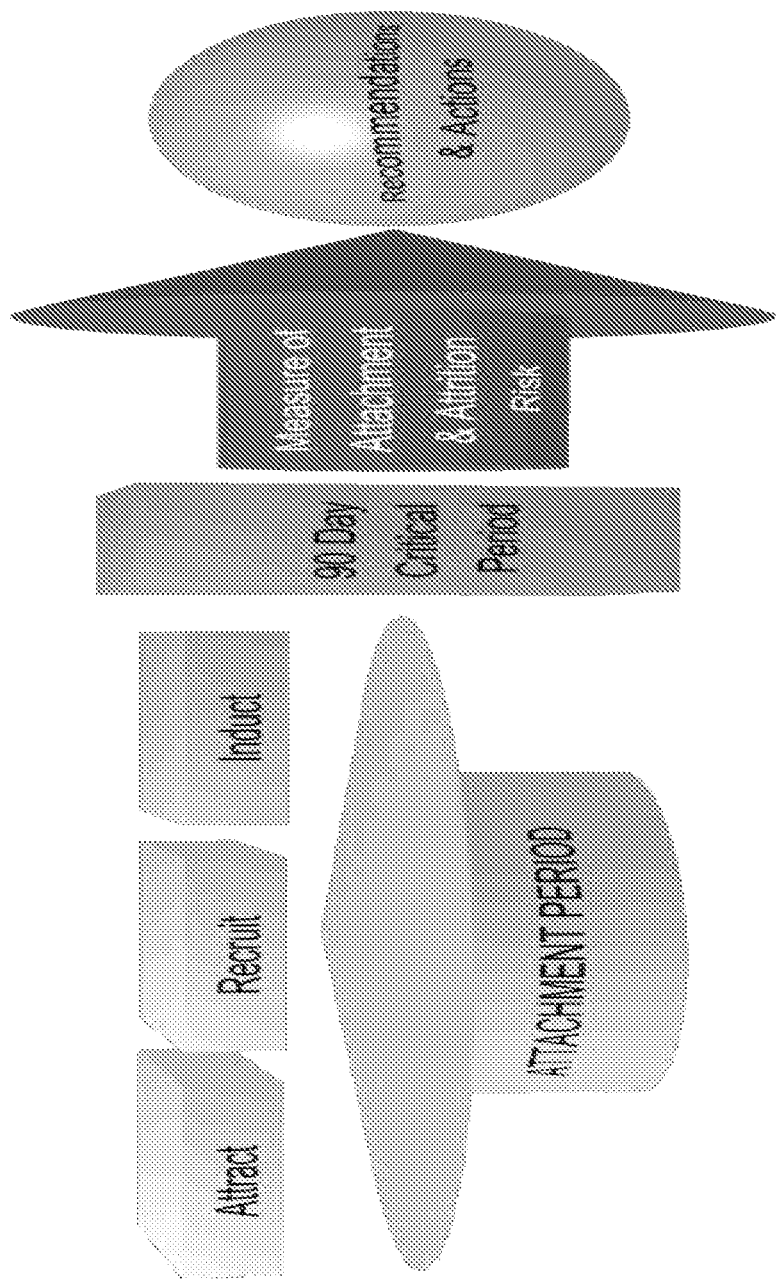
FIG. 5 is a schematic representation of critical period of Attachment (120 days) where it can be accurately measured at or around the $90^{th}$ day.

FIG. 5 shows that although the critical period of Attachment is 120 days and based on research to date, it can be accurately measured at or around the $90^{th}$ day. The measure of Attachment at this point-in-time provides a significant window for the opportunity for either re-enforcement or correction on each of the Attachment Drivers.

Low or moderate levels of Attachment in the first 120 days have a strong correlation with employee departures prior to 18 months of employment. There are exceptions; however, realising the consistent cause, rather than the exception, is more beneficial to an organisation.

The Attachment period is the first approximately 120 days from the day of commencement for a new employee. The Attachment measure comprises the following events:
1. the first valid measure of Attachment can be taken at around 90th day of employment, which is representative of the first 120 days;
2. Attachment can be measured at any time from around the 90th day of employment until the 120th Day;
3. the manager has a window of approximately 25 days to change the Attachment perceptions of the new employee relative to the 20 Drivers (or measurable discriminating indicators) of Attachment; and
4. the Attachment period directly impacts the first 18 months of employment.

There are 3 distinct sub-phases of the overall phase of Attachment. These include attraction, recruitment and induction. Though the attraction and recruitment phase can last for varying amounts of time, the induction phase is regarded as critical to the determination of the first 120 days. The assessment of Attachment takes into consideration the prior 2 sub-phases but these do not impact on the measure of Attachment unless the person commences employment.

According to one embodiment of the invention there is provided a tool for the measurement of the level of Attachment. This measurement is achieved by measuring a plurality of core Drivers, which consist of conscious and subconsciously assessed criteria that are common to new employees during the phase of Attachment.

Figure 6:
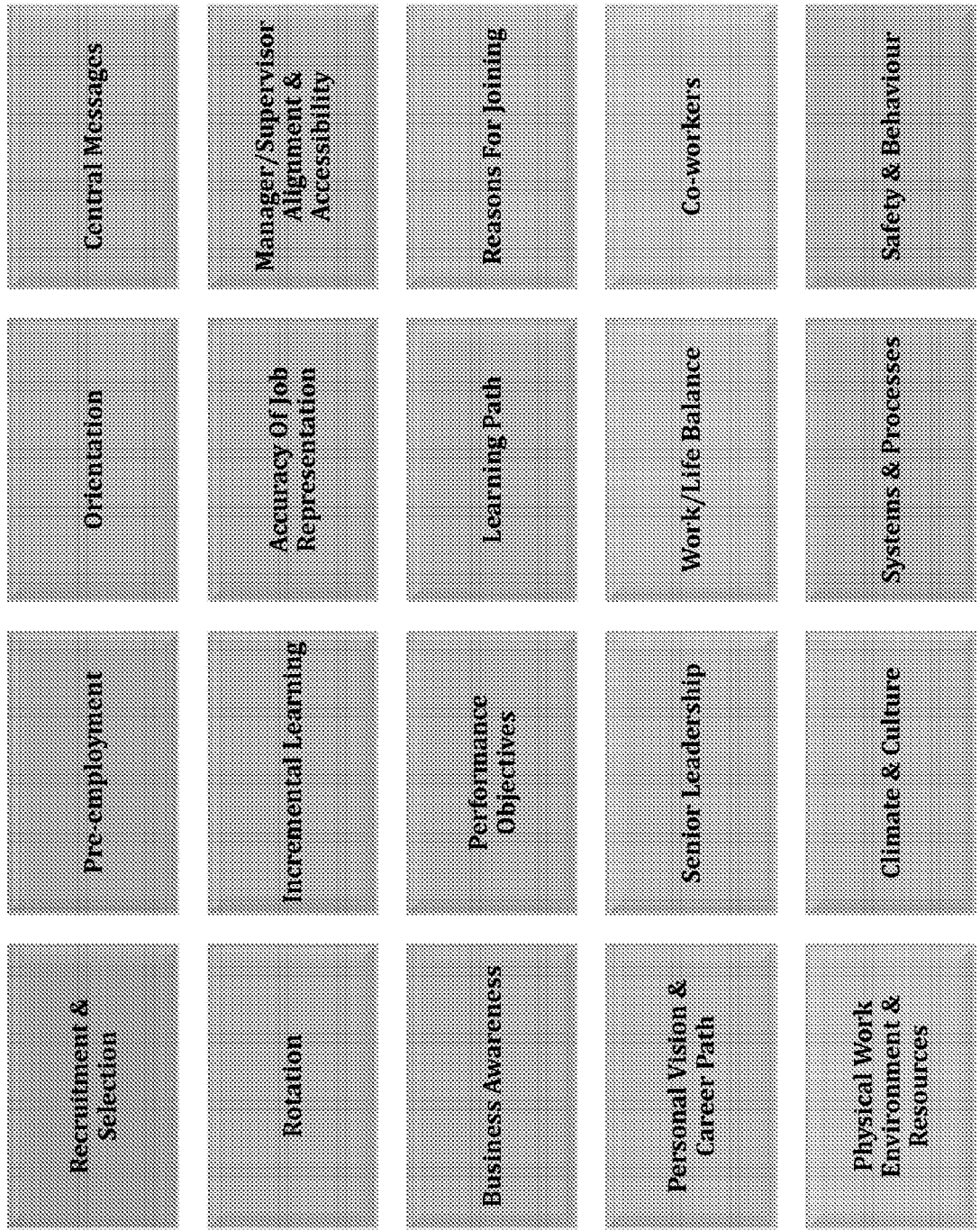
FIG. 6 is a schematic representation of a core set of "Drivers" that are common to employee's during this Attachment phase or the first 120 days.

FIG. 6 shows schematically a core set of "Drivers" that are common to employee's during this Attachment phase or the first 120 days. These Drivers have been identified from research surrounding new employee trends and exiting employee trends and noting their differences.

Such Drivers are regarded as common to new employees commencing at workplaces of structures with 3 or more reporting levels, for example, containing the following strata:
Level 1: Organisation (social structure)
Level 2: Senior leadership (power)

Level 3: Manager (primary carer)

Level 4: Operational employee (member)

The Attachment alignment measurement system, method and device's gathering of responses from one or more target employees utilises said Information Collection system's being delivered in accordance with arrangements between said Management and one or more Information Interpretation systems involving third parties who administer and manage said response to glean observations and, in turn, to provide recommendations and other benefits, either directly or indirectly to the workplace manager(s) and/or employee(s). Security and confidentiality of the information is kept as required by workplace requirements which includes legal, ethical and agreed requirements.

Figure 7:
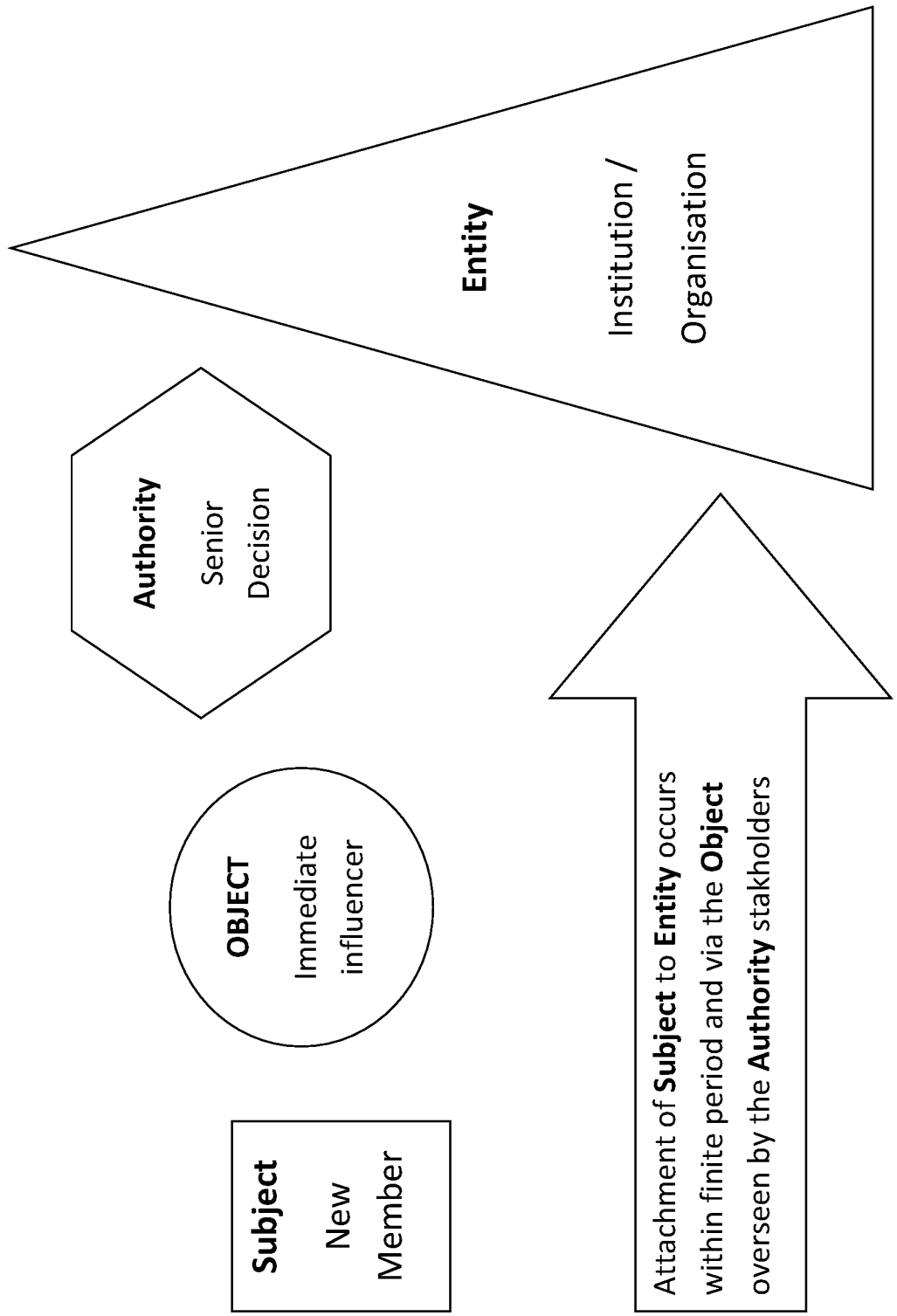
FIG. 7 is a schematic representation of the complexity of relationships with 3 levels with two levels of control.

FIG. 7 shows the complexity of relationships with 3 levels with two levels of control—here represented by the immediate influencer and the authority. For workplace structures of only 2 levels, a number (and, in some embodiments, the type) of Drivers are different.

For a target (subject) employee Attachment, the level of Attachment is determined by the perceived strength of the bond associated with a core set of conscious and subconscious criteria known as Drivers of Attachment. In this arrangement there are 20 Drivers of Attachment used to provide a determination of the level of Attachment. Although in other arrangements different Drivers of Attachment can be used either separately or in various combinations.

Examples of three Attachment Drivers are shown in Annexure 1 with accompanying explanations.

The attachment alignment measurement system's architecture is described below according to a preferred embodiment of the invention. The attachment alignment measurement system utilises a series of modeling, viewing and controlling steps applied via software within the computing architecture to separate functions as follows:

1. The "modeling" step enables the data to be modeled so that data can be observed as like data and outliers. The "model" component also allows business rules to be applied to the data so as to interpret the measurement data collected from:
   a) the Subject's actual attachment to a social structure (Actual Attachment); and
   b) primary carer's perception of the Subject's Attachment to said social structure (Perceived Attachment);

Such data is entered as scores which, once business rules have been applied, enables a "variance" score to be computed at the controlling step so that the data is transformed to meaningful information in the form of a report. This Attachment alignment report can be viewed in the "viewing" step listed below, or alternatively generated as a physical report.

This "model" step in the processing of the data provides a means to extrapolate information from the data in the form of a measurement of Attachment Variance between:
   a) the new member (Actual Attachment); and
   b) the primary carer (Perceived Attachment).

The business rules are applied to interpret the measurement data collected. Such rules include normalisation of the form of the data, capturing and highlighting exceptions to the data, transformation of the data into a form appropriate to perform calculations upon and other business rules that are applicable to cleanse the data so that the data is in a form to enable the extraction of appropriate information at the controller step.

2. The "viewing" step provides the viewer a point to interact or apply any data adjustments or manipulations (such as re-weighting data to overcome discrepancies in data reporting), application of different models, or to view the data from a different perspective (such as how the data from a particular user regarding Perceived Attachment has changed over time or with the number of reporting subjects managed). This step allows the data to be, if required, interfaced with a viewer so as to allow a viewer to become an "analyst" so that a command is enabled to be sent to, for example, the controlling step to apply an adjustment factor to the data.

This viewing step enables the means for an analyst to apply changes to the data before it is to parsed to the "controlling" step, which presents the output, albeit in a report or otherwise. It is important to note that the "viewing" step does not contain the business rules (as this is performed by the "modeling" step) or to interpret the data provided, and possibly adjusted by the analyst, into information in the form of a tangible report (this is performed by the "controlling" step).

In one embodiment the "viewing" step takes the form of a passive view, wherein a viewer has no interface components to interface with the "controlling" step.

3. The "controlling" step enables interpretation of any analyst's actions applied in the form of commands as captured by the "view" module. The "controlling" step interprets commands by executing a sequence of steps, and if required, adjusting the model appropriately. The "controlling" step provides the final point of calculation of the data before the Attachment alignment measurement report is generated.

The "modeling" step is the first point of adapting specific data from:
1. the primary carer's perception of the Attachment level of the new member; and
2. the new member's actual Attachment;

so as to enable the data to have business rules applied. The application of business rules to the data enables a determination as to the "fitness" of the data. If the data is not suitable, then there will be either business rules applied to make the data suitable or otherwise, if such rules cannot be applied, then the data will be rejected. Such modelling is enabled to be viewed in the "viewing" step. This "modelling" step prevents information being extracted from "rubbish" data. Data "fitness" relates to the accuracy of the data collection, the resolution of the data capturing techniques—that is, how it was measured how effectively it was recorded.

The reason for this step is that the raw data cannot be contaminated by any form of analysis or business rule application. Therefore, each step is applying modifying rules to the data so as to transform the data into a new data set whilst protecting the integrity of the original data measurement set. This also enables an audit trail of all data adjustments and/or manipulations to be contained and reported on, if required, in the final report.

The modelling step may be involved in reiterations of the data such that if viewing step manipulates the data via the involvement of an analyst, then the output from the "controlling" step adjusts the data via the commands processing the data, which in turn may produce a remodeling of the data.

The "viewing" step enables the viewer, when enabled to take an analyst's role, to parse commands on the data to the "controlling" step to compute such commands.

The "controlling" step enables interaction between the "model" and the "view" by:
1. interpreting commands from the "view" step and analysing these commands and data, so that they are reported to the "modeling" step such that remodeling can take place if the data has changed via the "view" parsed commands; and
2. receiving and interpreting the "remodeling" in the view step and sending such remodeling to the "view" step.

In still another embodiment, once the data is settled, then the variance score is mapped using declarative mapping to enable the determination of Drivers and the associated reasoning as to why the primary carer may or may not be addressing Attachment driver perceptions during the first 90 days.

In still a further embodiment, declarative mapping is used as a subgroup of declarative programming steps so as to express the computation logic by describing what the mapping must accomplish out of a range of possible outcomes.

Declarative programming in the Attachment alignment measurement tool, system and method uses formal logic, and the computations are applied as deductions in that logic space of the "Model". This enables the "model" and "view" steps to appear as meaningful manipulations of the data. Thus the data can be tweaked and viewed as required to optimise the output in the form of the report.

Attachment Alignment Measurement System

The Attachment alignment system consists of the following:

1. The Attachment measurement tool is an interface with one or more workplaces of an organisation;
2. Individual employee profiles are entered into the Attachment measurement tool's Information Collection System before a determined criterion such as a critical time or critical date, which when measuring Attachment, must be prior to the 90th day of employment;
3. One or more target employees are selected by the Information Collection System from the individual profiles entered;
4. Communications, for example, automated emails, are sent to the target employee(s) at the 90th day of employment. This email may include a unique link to an Information Collection System, such as a web link for previously enabled for the individual target employee;
5. The communication and/or web link(s) deliver driver mediated stimuli such as questions, workplace scenario movie clips or other stimulus which relate to, in this example, the Attachment drivers concerned such as there are measurable evoked responses. The evoked responses are collected via the Information Collection System.
6. Perception based measure—responses are evoked from the new employee about their view, understanding, experience or perception of the example 20 Drivers. Each Driver has 5 responses evoked in non-sequential order for a total of 100 responses. For example, each Driver may have 5 questions for which the questions are asked in non-sequential order for a total of 100 questions.
7. The Information Collection System is enabled to collect the responses, in the form of individual responses, and/or as Attachment scores (accumulative scores) to each Driver using a computer mediated processing means. This is enabled via secure access through an on-line networked computer system.
8. A reminder is automatically sent at a preset period such as 3-4 days after the initial communication is sent, if the communication has not had responses received. An error notification is sent to the administrator if either email has not been delivered to the intended recipient.
9. Alert notification email is sent to the administrator once the responses have been received.
10. Back end reporting is enabled by:
    a. grouping of questions and scoring by Driver by target employees and by groups; and
    b. matrix reporting for groups can be run for any set of filters recorded—age, gender, common company, common manager, geographic location etc.
11. Individual Driver scores are input into the information interpretation system.
12. Using the individual Driver scores and the total accumulative Attachment score, the Information Interpretation Systems selects a set of associated pre-written "Observations" generated by associated the Attachment score through the steps of collection, storage, matching and processing of data including:
    a. data relating said workplace, including consent;
    b. data relating to said workplace communication, including observation detail; and
    c. Attachment information relating to observations, recommendations, graphs and images based on computational scoring.
13. This information interpretation systems in its simplest form comprises an entry screen into to database, XML filing system or a spreadsheet such as MS Excel, which links to generated sub-pages of graphs, and associated images and text (where a driver score is associated to a specific observation and the combination of specific scores and observations leads to specific reports that consists of both generated graphics and selected associated text).
14. The response computational data in the form of observations and/or recommendations once updated is saved and a linked to a report generator, such as a word processor template contained on a software program which is then opened and populated automatically from the response computational data and associated calculations and associations.
15. The populated document does not report directly on the answers to the Attachment measurement tool's questions. These remain secure and confidential and reside on the information interpretation systems which is functionally separate to the reporting system.
16. Once populated the document is saved into an non-editable readable file such as a PDF file as a final report which is then emailed to the nominated recipient(s), such as the hiring manager and the human resources (HR) personnel/senior leader representative.
17. Trended reports on Attachment levels can also be calculated when there is a minimum of 3 respondents per category. These are enabled to be requested by personnel such as managers, HR, senior leaders and other nominated officers of the organisation undertaking the measurement of Attachment in the workplace.

The information will be gathered from the primary carer in the form of questions (in the order of 10 to 90) with a point rating scale for each question to quantify the outcome. The calculation of the perceived score is based on the information provided by the primary carer. This quantitative assessment of the perceived score is then compared to the actual Attachment score derived from the employee, from which an Attachment Variance score is derived.

For trend reports, the scores for all actual and perceived Attachment scores will be averaged and the Attachment Variance score will be produced based on these.

Attachment Measurement Metrics

During the Attachment period (around the first 120 days of a new employee-workplace relationship) each of the chosen Drivers has been determined to have an equal weighting to contribute to the accumulative Attachment level of a measured employee. That is, there is no significant difference in the influence of any one Driver over another Driver in this initial period.

This is different and advantageous to known systems such as measures of employee engagement where each Driver has a separate weighting. For example, employee engagement Driver weightings are relative to two key polar influencers: a) desired engagement parameters, and b) industry benchmarks. In Attachment, the Driver is only relative to 100% as all Drivers are of equal importance during the first 120 days.

Attachment measurement methodology and psychometric validity requires either a 3 question structure with a 3 point rating scale if including a false positive response, or a 5 questions structure with a 3 or 5 point rating scale if not including a false positive response. False positive response inclusion is to provide an honesty rating scale with fewer questions.

The inventor has determined that in the preferred embodiment the use of a 5 question structure with a 5 point rating scale is optimal when 20 Drivers are used in three tier organisations. That is, each Driver has 5 questions with an option of 5 levels of response per questions ranging from "strongly disagree" through to strongly agree".

An example of one Attachment Driver is shown in Annexure 2 with accompanying outcomes and recommendations dependent on the Attachment tool's findings followed by a summary.

Because the Drivers have equal weighting, a total cumulative Attachment score is the average of the total of all 20 Attachment Drivers. The percentage bands for the level of Attachment, risk of attrition, observation and recommendation per Driver and for the total accumulative Attachment score are displayed on table 1:

TABLE 1

| Attachment Level | Range | Band % | Risk | Observation | Recommendation |
|---|---|---|---|---|---|
| High | High-High | 91-100 | Low | 1 | 1 |
| High | High-Low | 81-90 | Low | 2 | 2 |
| Moderate | Moderate-High | 66-80 | Moderate | 3 | 3 |
| Moderate | Moderate-Low | 51-65 | Moderate | 4 | 4 |
| Low | Low-High | 26-50 | High | 5 | 5 |
| Low | Low-Low | 0-25 | High | 6 | 6 |

Each Driver has 1× definition, 6× observations, 6× recommendations which are selected and placed into the report depending on the relative Attachment score. The same is the case for the total Attachment Score with the exception of a definition.

The observations and recommendations in the report are linked to the actual Attachment score of the new employee. The inclusion of the perceived and variance score generated by the inclusion of the primary carer's score allows a professional assessment to be performed which evaluates the threshold and its accompanying drivers so as to lead to a behavioural impact assessment.

There are a series of questions per driver such as, for example the following:

Selection:

Q1 Please rate the level of satisfaction you believe your new employee holds for the recruitment and selection process they underwent when securing this position (1-10 rating scale)

Q2 Please rate the level of professionalism you believe your new employee feels they experienced during the recruitment and selection process. (1-10 rating scale)

Example Perceived Score 16/20=80%

Example Actual Score=65% (this score still drives the observations and recommendations in the report)

Example Variance Score=15% (acceptable)

Orientation:

Q1 Please rate the level of satisfaction you believe your new employee holds for the Orientation process they experienced in their first few days including their initial welcome, provision of business resources and tools and their introduction to senior leaders in the business. (1-10 rating scale) Q2 Please rate the level of professionalism you believe your new employee feels they experienced during the Orientation process. (1-10 rating scale)

Example Perceived Score 10/20=50%

Example Actual Score=85% (this score still drives the observations and recommendations in the report)

Example Variance Score=−35% (problematic)

There is no difference in the variance score being positive or negative as either way it will have impacted the behaviour of the manager.

Figure 8:
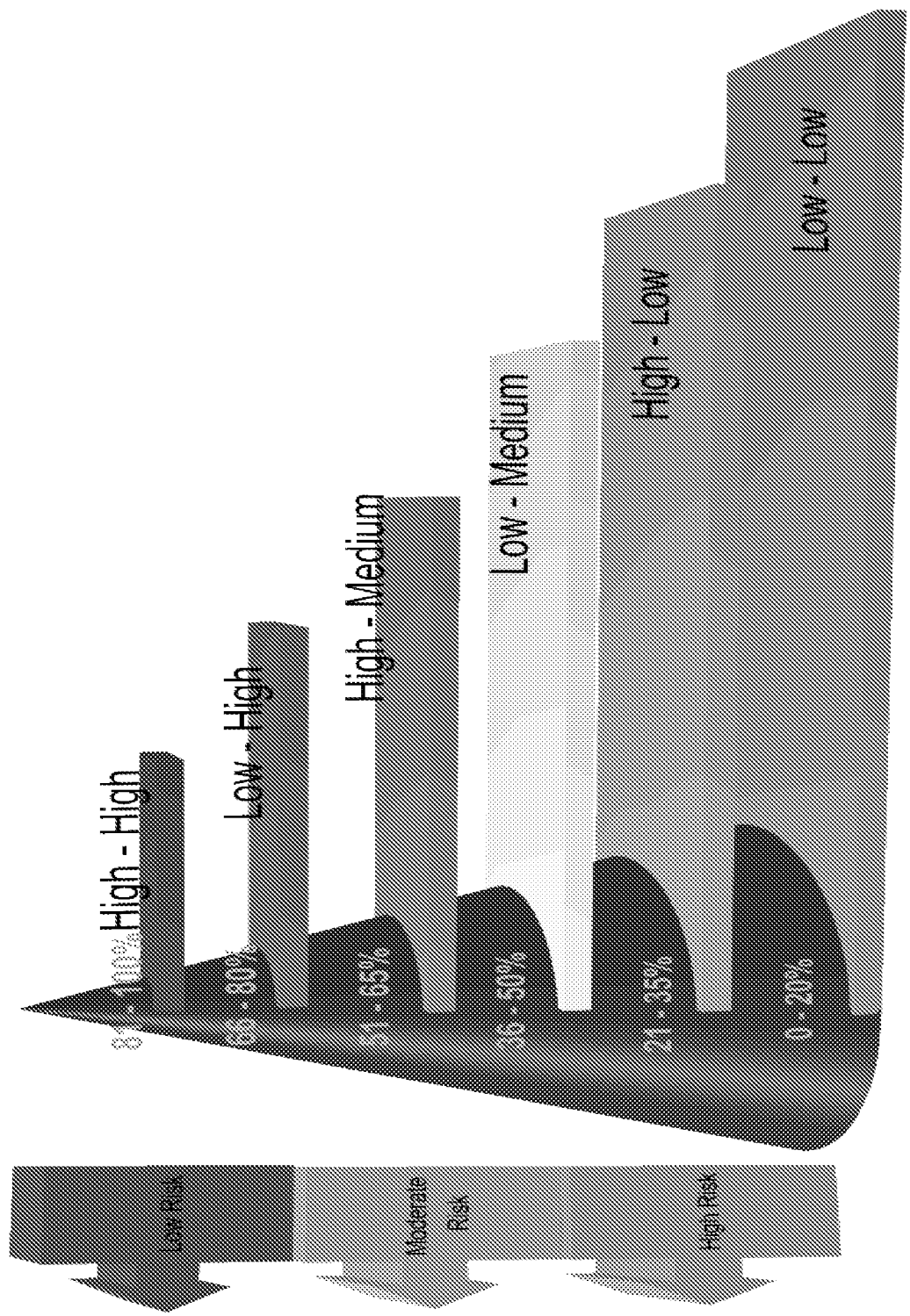
FIG. 8 is a schematic representation of the driver Attachment score and accumulative Attachment score's relationship to risk.

FIG. 8 shows the Driver Attachment score and accumulative Attachment score's relationship to risk as ascertained in the variance scores above.

Features of the Attachment Alignment Measurement System, Method and Device

The measurement of Attachment alignment to a social structure (e.g. the workplace) does not adopt known employee surveying methodologies where the survey aims to directly measure the respondent or gain direct feedback on a specific person.

Figure 9:
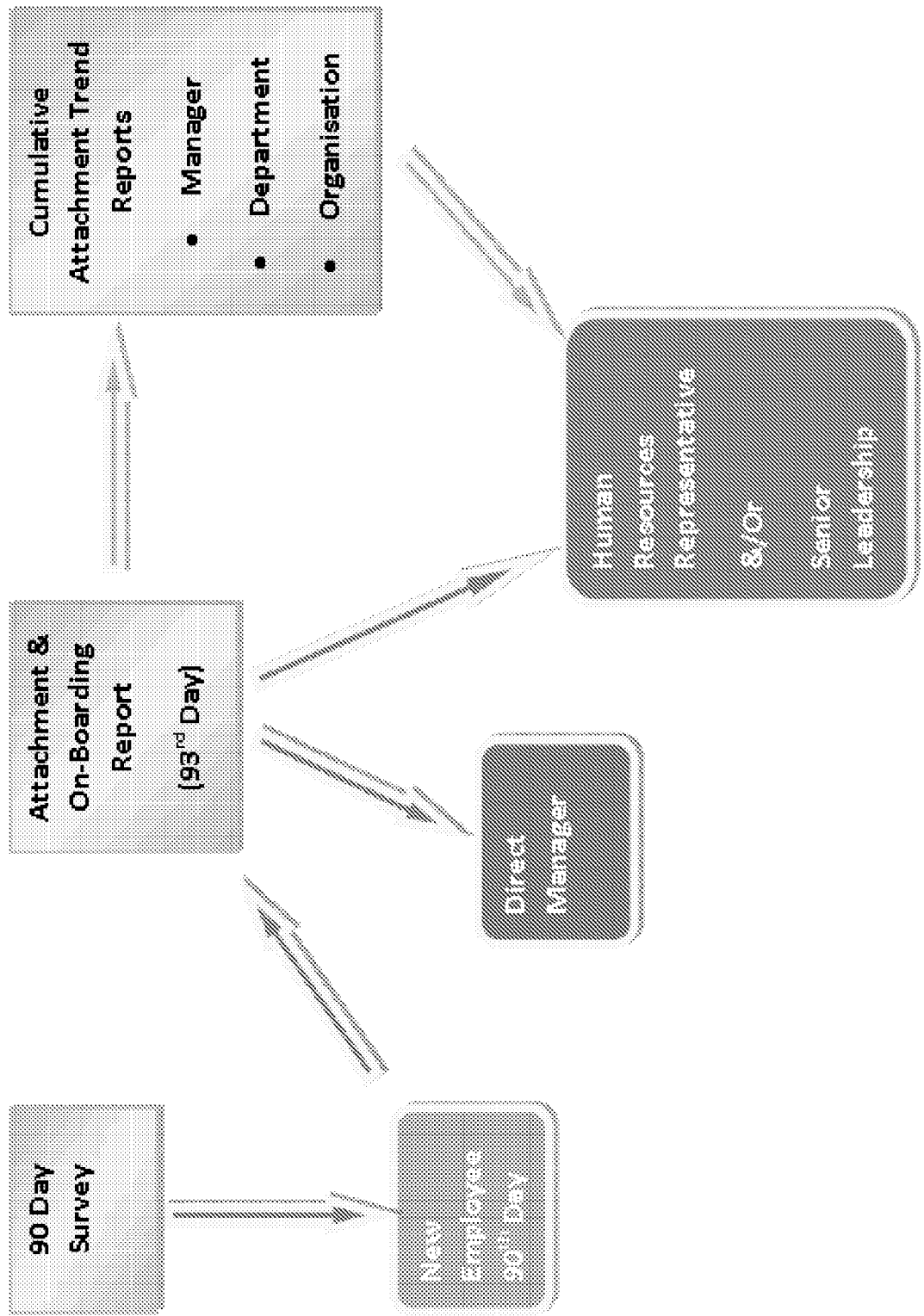
FIG. 9 is a schematic representation of the Attachment measurement tool's determination of how, at a critical time, the inter-relationship between the manager/organisation are performing in relation to the perceptions of the employee based on period unique criteria.

Using the workplace as an example of a suitable social structure, FIG. 9 shows the Attachment alignment measurement determination of how, at a critical time, the inter-relationship between the manager/organisation are performing in relation to the perceptions of the employee based on period unique criteria.

Figure 10:
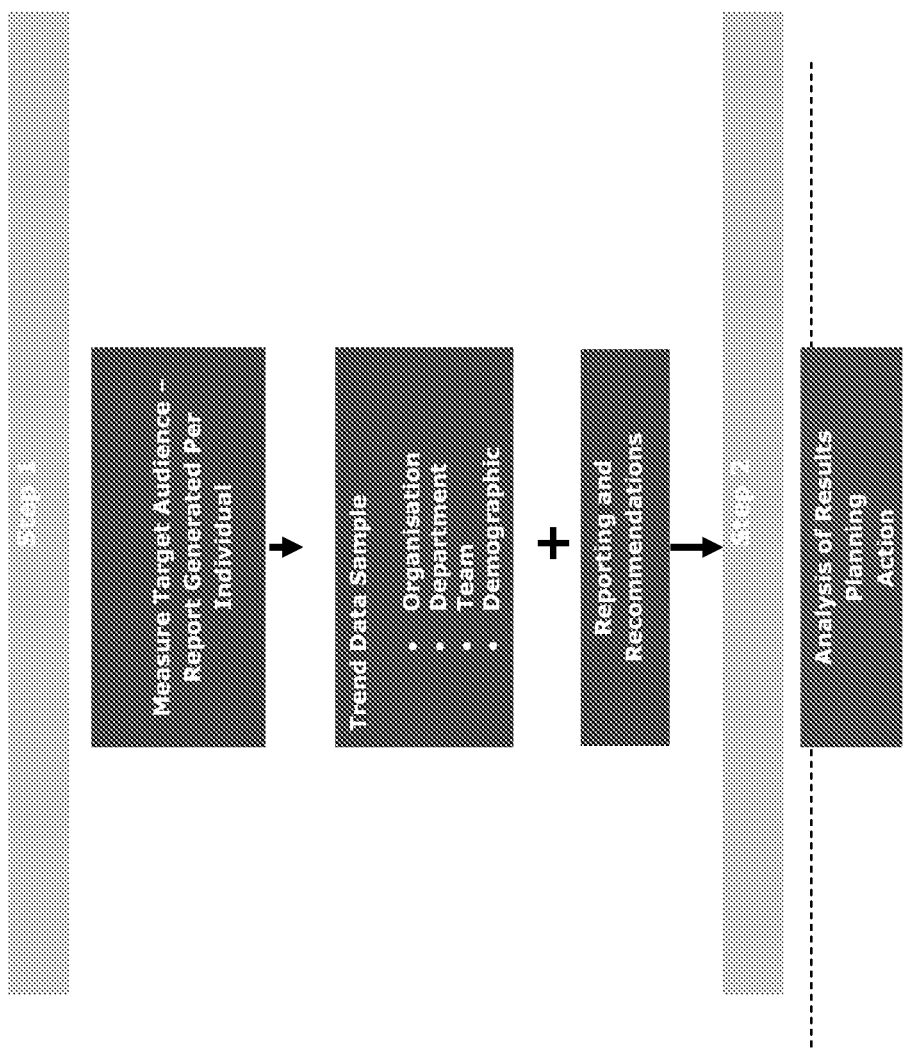
FIG. 10 is a methodological flowchart of Attachment measurement tools accounting of other parties who also provided guidance and direction through access to the individual reports so as to provide trend reports.

FIG. 10 utilises the methodology of Attachment alignment measurement to take into account other parties who also provided guidance and direction through access to the individual reports so as to provide trend reports. Therefore, this enables trend reporting to be also useful within an organisations assessment of Attachment alignment.

The Attachment Drivers have been identified as critical factors in processing the responses that are given by the subject to enable a rational and accurate assessment. These are used in the Attachment measurement to avoid the inclusion of "false positive response oriented questions" which often cause the respondent to feel like they are being tested.

Though contributing to employee engagement, new member (e.g. employee, student, client) Attachment is the key foundation to achieving engagement with the social structure (e.g. workplace, school, supplier). The measure of Attachment differs to engagement in the Drivers, timing, methodology and purpose of reporting. A key difference in scoring and weighting is that in engagement they are relative to a) desired and b) benchmarks based on individual Driver weightings. In one arrangement, all Attachment Drivers have an equal weighting and all are relative to 100%. In other arrangements, weighting of Drivers may differ—e.g. depending on the relevant social structure.

The application of Attachment alignment measurement to the commercial environment and the ability to apply it to any social structure takes the concept beyond its former application.

In the measure and reporting of alignment and variance in Attachment, a measure of the primary carer's perception of the Attachment level of the new member is required, followed by a comparison of the "actual" and "perceived" Attachment, to obtain a "variance" score.

This Attachment Variance score will provide a quantifiable measure for the primary carer of the difference in the perceived Attachment level of the new member (held by the primary carer) and the actual Attachment level of the new member. This will be a significant improvement for the primary carer who is then able to better prioritise the specific drivers that need to be addressed by assessing the 3 key measures of "actual Attachment", "perceived Attachment" and "variance". Where previously this comparison was done subjectively by the primary carer after receiving the report, this improvement creates the opportunity to do this objectively and quantifiably at the same time and included within the one Attachment report.

The methodology for enabling this improvement is to leverage existing technology to enter, gather and report. The addition will be to distribute via email, at the first valid measurement date during the critical Attachment period, a separate survey to the primary carer to rate the perceived Attachment level of the new member. The reporting system will then include these results and generate the variance score and priority rating.

Attachment Report Overview

Where most diagnostics aim to provide a measure on the individual responding or are requested to provide feedback directly about another person, the Attachment measurement report provides different measurement parameters.

For the Attachment measurement report, the Attachment measurement responses are grouped by "Driver" of Attachment and the corresponding score reflects a level of Attachment for that "Driver". The Attachment measurement report further contains calculations of Driver scores to choose the selection of observations and recommendations aimed specifically at the direct manager of the Employee as they occur relative to the new employee.

Attachment Alignment Report Overview

Ideally when the Drivers are fully focused on the relationship to be assessed and the questions are closely honed to resolve the issues to be determined, then the professional assessment is to look for a low level of variance to indicate an accurate assessment by the Primary Carer of the level of Attachment actually achieved by the new employee.

The inventor has focused the assessment so they are able to achieve a resolution that shows that a variance of less than 10% is indicative of an accurate assessment of the primary carer's perception is on par with the subject's actual Attachment.

Variance greater than 10% variance indications the primary carer's perception is significantly different to that of the employee's actual Attachment. Consequently, such a variance will be impacting on their behaviour towards each other (anything 10% or less will not have significantly impacted their behaviour).

Likewise, a variance of:
a) 11%-20% will place this in the moderate impact range (of the primary carer's behaviour); and
b) 21% or greater will place this in the high impact range.

Variance can still be used to qualitatively, as opposed to the quantitatively, relate to Attachment and it's impact on behaviour as either low, moderate or high.

These Attachment alignment reports are generated automatically by the system. The perceived Attachment and variance scores will not impact the observations and recommendations linked to the actual Attachment Score.

This selection of observations and recommendations is the outcome of a perception based measure of the employee's Attachment during the critical period in which the perceptions are formed from 90 to 120 days. The report provides a guidance tool to the manager as to how to correct or shift the perception of the new employee to a higher level of Attachment.

For example if Attachment was Moderate at the $90^{th}$ day and no action was taken to correct this, it is likely that Attachment will be moderate at 120 days. The report is designed specifically to provide the measure of Attachment (therefore the measure of risk of attrition) but importantly:

1. why this level of Attachment is likely to have been achieved; and
2. What can be done to either correct or maintain the level of Attachment?

It is the correcting or improving Attachment that is most significant to the new employee as this will directly impact the:
a) risk of attrition;
b) Level of discretionary effort; and
c) Performance level for the employee over the first 18 months.

The preferred embodiment of the invention contain the generation of an Attachment measurement report which includes:
i. Definitions of the Attachment Drivers used;
ii. Provides a score of Attachment as a total and by individual Driver;
iii. Indicates the likely reasons for the level of Attachment that has been achieved;
iv. Provides recommendations and advice on how to correct/improve or maintain Attachment levels during the remaining critical period; and
v. Provides a risk of attrition rating overall and for each Driver of Attachment.

An example of the overall Attachment rating is contained in Annexure 3. The report is of and for the manager though it is derived from the answers provided by the new employee. Importantly the recommended actions to the manager relate to the maintaining or altering of the perceptions of the new employee within the critical 120 day timeframe.

Where most diagnostics provide a measure on the individual responding, the Attachment tool provides an assessment of the "Drivers" of Attachment and the corresponding score reflects a level of Attachment for each "Driver". In turn, observations & recommendations are provided to the direct manager of the employee as they occur relative to the new employee. This provides guidance to the manager as to how to correct or shift the perception of the new employee to a higher level of Attachment which has the noted commercial ramifications.

The invention thus provides an Attachment alignment measurement system, method and device, for identifying the level of alignment (or misalignment) between a subject's Attachment to a social structure—for example, a new employee's Attachment to an employer (e.g. manager/workplace, a client's Attachment to a supplier, or a student's Attachment to a teacher/school.

An advantage of the preferred embodiment is that it is a means for measuring differences between actual and perceived Attachment of a new member to a social structure such as a new employee to a workplace, worshipper to a congregation, teacher or pupil to a school, nurse to a hospital.

A further advantage is that the invention provides a means for influencing primary carer (e.g. manager) behaviour towards a subject/new member such as a new employee, or an existing employee moving to a new team. This is useful beyond the situation of a new employee joining an organisation since the majority of new member relationships in the workplace context arise from internal realignments (e.g. promotions, lateral hires, group restructure) compared with external (new) appointments.

Although the invention has been described with reference to specific examples, it will be appreciated by those skilled in the art that the invention may be embodied in many different other forms.

Annexure 1

Examples of Attachment Drivers

Preemployment

"The way the new employee was encouraged to feel secure and excited about their new position and the strength of bond achieved between the moment of being offered the position and the date of commencement."

Recruitment & Selection

"The level of efficiency and professionalism associated with the recruitment and selection process impacting the perception of operating standards and the value the new employer places on employees."

Orientation

"The way the organisation welcomes the new employee for their first day or days of employment. Associated specifically with the initiation of key interpersonal relationships with their immediate team and where possible senior leaders. The way the organisation establishes the perception of personal space for the new employee and has prepared and issues agreed business tools and access. The orientation to the physical workplace and immediate surrounding environment."

Annexure 2

Detail of Driver 4

Central Messages

"Core messages and knowledge associated with the company's structure, mission, vision, direction, philosophy, values, behavior articulated consistently by owners, senior leaders, managers and general staff. The collective understanding of who the business is, where the business is going and how the business is to collectively behave along the way."

Organisations that achieve a high level of awareness and understanding of their structure, mission/vision/direction/philosophy, values, and subject behavioural expectations experience higher levels of subject Attachment than those that do not. Direct and regular contact with and general accessibility to owners, leaders and managers from across the business also impacts the respective level of Attachment in this Driver.

Many companies believe that a welcome letter, or a quick 15 minute presentation by a senior leader during a central induction program is sufficient to achieve good understanding in these core messages. This supported usually with a subject handbook and possibly some wall banners, past prospectus or overview document, the website and marketing collateral is usually provided to attempt to drive higher levels of awareness.

It is usually the single greatest influencer that is often neglected or undervalued by businesses. The general visibility and informal communication from leaders of all kinds from across the business, who consciously and consistently take the time to check in with the new subject about their understanding on all of these core central messages.

Things That Can Impact This Driver

Ensure all of the core messages are consistent and represented in multiple locations Ensure managers and leaders are all aware of and can consistently articulate these core messages Ensure the behaviours of the managers and leaders across the business are in line with the messages worth promoting Encourage leaders and managers to be aware of new subject and to actively seek them out during the first 90 days to discuss their area of the business and the business in general Encourage questions be asked and ensure you provide a reasonable response within a short time frame—some organizations have an "ask the CEO" or similar internal email that questions can be directed to Encourage the senior leaders and or owners to regularly talk formally and informally to the business about the core central messages Driver 4 Central Messages How would you rate organization regarding the normal recruitment and selection process?
Very High
High
Upper Moderate
Lower Moderate
Low
Very Low Very High As a manager you have role-modeled the behaviours expected of subjects and with Leaders you have done so in alignment with the organization's values. There has been strong communication and a perceived accessibility from all levels of leadership and management within the business which has created a solid understanding by the new subject of who the company is, its structure, where it is heading, what it does, and how it goes about operating.

Recommendation

Ensure the messages received and the behaviours being showcased continue to be in alignment with expectations and the organisation values. Though you have worked hard to establish the current understanding and behaviours over the first 90 days, the first 18 months are still highly formative and a new subject can easily be influenced by other subjects. Ensure consistency with communication and behaviours and conduct regular reviews or link-ups with the new subject going forward.

High

As a manager you have role-modeled the behaviours expected of subject and with leaders you have done so in alignment with the organization's values. There has been good communication and a perceived accessibility from both leaders and management within the business. You have created a good understanding for the new subject of who the company is, its structure, where it is heading, what it does, and how it goes about operating.

Recommendation

Ensure the messages received and the behaviours being showcased continue to be in alignment with expectations and the organisation values. Though you have worked hard to establish the current understanding and behaviours over the first 90 days, the first 18 months are still highly formative and new subject can easily be influenced by other subject. Ensure consistency with communication and behaviours and conduct regular reviews or link-ups with the new subject going forward.

Upper Moderate

As a manager you have role-modeled the behaviours expected of subject and with leaders you have done so mostly in alignment with the organization's values though this may not have been consistently observed. There has been effective communication and moderate perceived accessibility from both leaders and management within the business. Though you have created an understanding for the new subject of who the company is, its structure, where it is heading, what it does, and how it goes about operating, there is still an opportunity to improve this knowledge.

Recommendation

Ensure the messages received and the behaviours being showcased are consistent and continue to be in alignment with expectations and the organisation values. Though you have been working hard to establish solid understanding and behaviours over the first 90 days, the first 18 months are all highly formative and new subjecfare easily influenced by other subject. Ensure consistency with communication and behaviours and conduct regular reviews or link-ups with the new subject going forward. Draw attention to and correct any behaviour that you observe to be out of alignment with expectations.

Lower Moderate

As a manager you are likely to have role-modeled the behaviours expected of subject inconsistently which has led to a perception of uncertainty. Along with Leaders you have likely behaved on occasion out of alignment with the organization's values. It is also likely that there has been inconsistent or low levels of communication from both leaders and management within the business and because of this a perception of inaccessibility has been created. It is likely that only a moderate understanding has been achieved for the new subject of who the company is, its structure, where it is heading, what it does, and how it goes about operating. It is likely that the new subject is feeling a bit confused and uncertain about the company's direction and their place in it going forward.

Recommendation

Review and, if need be, create new opportunities for the new subject to hear consistent messages from the business leaders and managers. If they have not met with or listened to a member of the Leadership team relating to mission, vision, values and direction during the first 90 days then set up a time for them to do so quickly. Review own communication patterns with the new subject and make sure this is regular, consistent and includes clear messages about the company, its structure, direction and performance. Ensure role-modeling consistent and high standards of behaviour in line with the company values. Intervene and correct any behaviour you observe that is not in alignment with expectations of the company's values.

Low

As a manager you have not been role-modeling the behaviours expected of subjects consistently which has led to a perception of uncertainty for the new subject. There is likely a perception that a non-alignment exists with the organization's values. It is also likely that there have been inconsistent or low levels of communication from you and the business leaders and because of this a perception of inaccessibility has been created. Little understanding has been achieved for the new subject of who the company is, its structure, where it is heading, what it does, and how it goes about operating. Finally the new subject is feeling confused and uncertain about the company's direction and their place in it going forward.

Recommendation

As quickly as possible create an opportunity for the new subject to hear consistent messages from the business leaders and managers. If they have not met with or listened to a member of the Leadership team relating to mission, vision, values and direction during the first 90 days then set up a time for them to do so now Review own communication patterns with the new subject and make sure this is regular, consistent and includes clear messages about the company, its structure, direction and performance. Ensure role-modeling consistent and high standards of behaviour in line with the company values. Intervene and correct any behaviour you observe that is not in alignment with expectations of the company's values but make sure you have not been behaving in that manner yourself of late first.

Very Low

As a manager you have not been role-modeling the behaviours expected of subjects consistently which has led to a perception of uncertainty for the new subject. There is likely a perception that a non-alignment exists with the organization's values. It is also likely that there have been inconsistent or low levels of communication from you and the business leaders and because of this a perception of inaccessibility has been created. Little understanding has been achieved for the new subject of who the company is, its structure, where it is heading, what it does, and how it goes about operating.

Finally the new subject is feeling confused and uncertain about the company's direction and their place in it going forward.

Recommendation

As quickly as possible create an opportunity for the new subject to hear consistent messages from the business leaders and managers. If they have not met with or listened to a member of the leadership team relating to mission, vision, values and direction during the first 90 days then set up a time for them to do so now. Review own communication patterns with the new subject and make sure this is regular, consistent and includes clear messages about the company, its structure, direction and performance. Ensure role-modeling consistent and high standards of behaviour in line with the company values. Intervene and correct any behaviour you observe that is not in alignment with expectations of the company's values but make sure you have not been behaving in that manner yourself first.

Summary

Are you potentially causing new subject's and all subject's for that matter to operate in a mode where they have limited or potentially inaccurate knowledge of who the business is, where is it headed and how it is going to get there? Some would say this is the definition of being lost. If you have even 1 person in organization who is lost, they are not only unproductive, they are usually scared, uncertain and would prefer to do nothing than do the wrong thing. If this should carry on for too long, they will become panicked and potentially starts behaving in ways that are counter-productive or they will seek an environment where they do not feel like this.

Annexure 3

Example of Overall Attachment Association of Outcomes with Recommendations

How would you rate organisation regarding the normal recruitment and selection process?
Very High
High
Upper Moderate
Lower Moderate
Low
Very Low

Very High

Congratulations—You have achieved a very high level of Attachment for new subject which places you in an extremely strong position to retain them and gain high levels of effort and performance from them over the first 18 months of employment bonding with you.

Recommendation

Review the Drivers in this report to understand more about the way in which you have been able to create a high Attachment, low risk environment. Use this information to impact the experience of future subjects entering business. If you achieve these results consistently, you are on the way to becoming a best employer workplace and will significantly impact the performance of business.

High

You have achieved a high level of Attachment for new subject which places you in a strong position to retain them and gain strong levels of effort and performance over the first 18 months of employment bonding with you.

Recommendation

Review the Drivers in this report to understand more about the way in which you have been able to create a high Attachment, low risk environment. Use this information to impact the experience of future subjects entering business. If you achieve these results consistently, you are on the way to becoming a best employer workplace and will significantly impact the performance of business.

Upper Moderate

You have achieved a moderate level of Attachment for new subject which places you in a weakened position to retain them and/or gain strong levels of effort and performance over the first 18 months of employment bonding. There is a need for you to address the Attachment Drivers that are showing moderate or low levels of Attachment in this report.

Recommendation

Review the Drivers in this report to understand more about the way in which you have created a moderate Attachment, moderate risk environment. Use this information to address any moderate or high risk Drivers with this subject that will also impact the experience of future subjects entering business. If you can improve these results with future new subjects then you will be on the way to becoming a best employer workplace and will significantly impact the performance of business.

Lower Moderate

You have achieved a moderate to low level of Attachment for new subject which places you in a weakened position to retain them and/or gain strong levels of effort and performance over the first 18 months of employment bonding with you. There is a need for you to address the Attachment Drivers that are showing moderate or low levels of Attachment in this report.

Recommendation

Review the Drivers in this report to understand more about the way in which you have created a moderate Attachment, moderate risk environment. Use this information to address any moderate or high risk Drivers with this subject that will also impact the experience of future subjects entering business. If you can improve these results with future new subjects then you will be on the way to becoming a best employer workplace and will significantly impact the performance of business.

Low

You have achieved a low level of Attachment for new subject which places you in a high risk position to be able to retain them and/or gain reasonable levels of effort and performance over the first 18 months of employment bonding with you. There is a need for you to address the Attachment Drivers that are showing moderate or low levels of Attachment in this report.

Recommendation

Review the Drivers in this report to understand more about the way in which you have created a low Attachment, high risk environment. Use this information to immediately address any moderate or high risk Drivers with this subject. You also need to be mindful of making changes to impact the experience of future subjects entering business. You need to improve these results with future new subjects to reduce the risk of having a high level of attrition and low performance. If you do not address the consistent level of Attachment you will be caught in a constant recruitment for replacement cycle and this will significantly impact the performance of you and business.

Very Low

You have achieved a low level of Attachment for new subject which places you in an extremely high risk position to be able to retain them and/or gain reasonable levels of effort and performance over the first 18 months of employment bonding with you. There is a need for you to address the Attachment Drivers that are showing moderate or low levels of Attachment in this report.

Recommendation

Review the Drivers in this report to understand more about the way in which you have created a low Attachment, high risk environment. Use this information to immediately address any moderate or high risk Drivers with this subject. You also need to be mindful of making changes to impact the experience of future subjects entering business. You need to improve these results with future new subjects to reduce the risk of having a high level of attrition and low performance. If you do not address the consistent level of Attachment you will be caught in a constant recruitment for replacement cycle and this will significantly impact the performance of you and business.

The invention claimed is:

1. A computer-implemented Attachment alignment measurement tool for measuring Attachment Variance in a social structure, comprising: a non-transitory computing device having a computer executing programming instructions for performing the steps of:
    a) measuring a Subject's actual attachment to a social structure (Actual Attachment) by presenting the Subject with stimuli concerning the Subject's attachment to the social structure, and recording the Subjects conscious responses and subconscious responses;
    b) measuring a primary carer's perception of the Subject's Attachment to said social structure (Perceived Attachment) by presenting the primary carer with stimuli concerning the Subject's attachment to the social structure, and recording the primary carer's conscious responses and subconscious responses;
    c) interpreting the measured conscious and subconscious responses by applying said measurement data obtained from steps a) and b) above to business rules via a modeling step;
    d) comparing, by the computing device configured by executing the programming instructions, Actual Attachment and Perceived Attachment to calculate an Attachment Variance, wherein the Attachment Variance provides an indication of alignment between Actual Attachment and Perceived Attachment;
    e) generating, by the computing device configured by executing the programming instructions, an Attachment alignment report according to the calculated Attachment Variance; and
    f) communicating, by the computing device configured by executing the programming instructions, said report to a designated recipient over a computer network.

2. A computer-implemented Attachment alignment measurement tool according to claim 1, for measuring Attachment Variance in a social structure, including programming instructions for performing one or more additional steps of:
    a) Measuring Actual Attachment and Perceived Attachment based on a pre-defined time period;
    b) Receiving, by the computing device configured by executing the programming instructions, adjustment commands from a user including adjustments to the measurement data;
    c) Applying the received commands to said measurement data such that said data is adjusted;
    d) Applying a modelling step to said measurement data to determine the data's fitness;
    e) Applying a viewing step to said measurement data to enable the input of adjustment commands;
    f) Applying a controlling step to said measurement data to apply adjustment commands.

3. A computer-implemented Attachment alignment measurement tool according to claim 2 for measuring Attachment Variance in a social structure, wherein:
    a) said pre-defined time period is a time period calculated from a critical event for said Subject.

4. A computer-implemented Attachment alignment measurement tool for measuring Attachment Variance in a social structure, comprising: a non-transitory computing device having a computer executing programming instructions for performing an Attachment alignment measurement method including the steps of:
    a) collecting data pertaining to subject;
    b) collecting response(s) from subject at specified time beyond subject's start date by recording the subjects conscious responses and subconscious responses to stimuli concerning the subject's attachment to the social structure;
    c) analysing data from subject's conscious responses and subconscious responses and nominate as Actual Attachment;
    d) collecting response(s) from primary carer, regarding primary carer's perception of said Subject's Attachment to said social structure, at specific time beyond subject's start date;
    e) analysing data from primary carer's response and nominate as Perceived Attachment;
    f) analysing difference between Actual Attachment and Perceived Attachment to determine Attachment Variance;
wherein the programming instructions enable assessment of alignment between:
    a) Actual Attachment, wherein Actual Attachment is a Subject's actual attachment to a social structure; and b) Perceived Attachment, wherein Perceived Attachment is a primary carer's perception of said Subject's Attachment to said social structure, such that Attachment Variance is assessed.

5. A computer-implemented Attachment alignment measurement tool according to claim 4 for measuring Attachment Variance in a social structure, including:
   a) report generation of alignment between Actual Attachment and Perceived Attachment comparison.

6. A computer-implemented Attachment alignment measurement tool according to claim 5 for measuring Attachment Variance in a social structure, including:
   a) said alignment is compared within a pre-defined time period relevant for said Subject.

7. A computer-implemented Attachment alignment measurement tool according to claim 6 for measuring Attachment Variance in a social structure, including said pre-defined time period is a time period calculated from a critical event for said Subject.

8. A computer-implemented Attachment alignment measurement tool according to claim 1, wherein the tool further includes an information interpretation system for calculating Attachment Variance by interpreting data collected from said Subject and said Subject's primary carer.

9. A computer-implemented Attachment alignment measurement tool according to claim 8 wherein the information interpretation system includes programming instructions for interpreting data collected from said Subject and said Subject's primary carer in accordance with one or more of:
   a) interpretation criteria;
   b) one or more interpretation matrixes.

10. A computer-implemented Attachment alignment measurement tool according to claim 8 wherein the information interpretation system is enabled to:
   a) collect data from the Subject to generate an observation regarding Actual Attachment to the social structure;
   b) collect data from the Subject's primary carer to generate an observation regarding Perceived Attachment;
   c) interpret the data to generate one or more observations on the data;
   d) generate recommendations based on the observations.

11. A computer-implemented Attachment alignment measurement tool according to claim 10 wherein the information interpretation system, configured by non-transitory programming instructions, generates one or more recommendations, said recommendations being populated automatically from said Attachment response data by performing calculations and associations between Attachment results and report recommendations selected from previously generated recommendations.

12. A computer-implemented Attachment alignment measurement tool according to claim 11 wherein the information interpretation system generates one or more recommendations based on one or more Driver weightings, relative to one or more of the following:
   a) desired engagement parameters, and
   b) industry benchmarks.

* * * * *